(12) United States Patent
Ficco

(10) Patent No.: US 9,178,693 B2
(45) Date of Patent: Nov. 3, 2015

(54) DISTRIBUTED MEDIA-PROTECTION SYSTEMS AND METHODS TO OPERATE THE SAME

(75) Inventor: Michael H. Ficco, Silver Springs, MD (US)

(73) Assignee: The DIRECTV Group, Inc., El Segundo, CA (US)

( * ) Notice: Subject to any disclaimer, the term of this patent is extended or adjusted under 35 U.S.C. 154(b) by 1687 days.

(21) Appl. No.: 11/499,635

(22) Filed: Aug. 4, 2006

(65) Prior Publication Data

US 2008/0033881 A1 Feb. 7, 2008

(51) Int. Cl.
| | |
|---|---|
| *G06F 17/00* | (2006.01) |
| *H04L 9/00* | (2006.01) |
| *H04L 29/06* | (2006.01) |
| *H04N 21/21* | (2011.01) |
| *H04N 21/23* | (2011.01) |
| *H04N 21/426* | (2011.01) |
| *H04N 21/433* | (2011.01) |
| *H04N 21/4402* | (2011.01) |
| *H04N 21/4405* | (2011.01) |
| *H04N 21/458* | (2011.01) |
| *H04N 21/462* | (2011.01) |
| *H04N 21/4627* | (2011.01) |

(Continued)

(52) U.S. Cl.
CPC .............. *H04L 9/00* (2013.01); *H04L 63/0428* (2013.01); *H04N 21/21* (2013.01); *H04N 21/23* (2013.01); *H04N 21/42684* (2013.01); *H04N 21/4332* (2013.01); *H04N 21/4402* (2013.01); *H04N 21/4405* (2013.01); *H04N 21/458* (2013.01); *H04N 21/4622* (2013.01); *H04N 21/4627* (2013.01); *H04N 21/632* (2013.01); *H04N 21/8456* (2013.01); *H04L 2209/601* (2013.01); *H04L 2209/80* (2013.01)

(58) Field of Classification Search
USPC ......................................................... 715/201
See application file for complete search history.

(56) References Cited

U.S. PATENT DOCUMENTS

| | | | |
|---|---|---|---|
| 3,794,922 | A | 2/1974 | Osborne et al. |
| 3,885,089 | A | 5/1975 | Callais et al. |

(Continued)

FOREIGN PATENT DOCUMENTS

| | | |
|---|---|---|
| EA | 0002703 | 8/2002 |
| EP | 0710017 | 5/1996 |

(Continued)

OTHER PUBLICATIONS

U.S. Appl. No. 60/814,888, titled "Methods and systesm for distributed content delivery", filed Jun. 20, 2006, total pp. 49.*

(Continued)

*Primary Examiner* — Scott Baderman
*Assistant Examiner* — Mustafa Amin

(57) ABSTRACT

Example distributed media-protection systems and methods to operate the same are disclosed. A disclosed example method comprises receiving a media stream at a first set top box (STB) via a content delivery system, splitting, at the first STB, the received media stream into at least two portions, allocating, using a processor at the first STB, a first of the at least two portions to the first STB and a second of the at least two portions to a second STB based on a pseudorandom seed, and storing the first of the at least two portions on the first STB and the second of the at least two portions on the second STB.

42 Claims, 17 Drawing Sheets

(51) Int. Cl.
*H04N 21/63* (2011.01)
*H04N 21/845* (2011.01)

(56) References Cited

U.S. PATENT DOCUMENTS

| | | | |
|---|---|---|---|
| 4,241,237 A | 12/1980 | Paraskevakos et al. | |
| 4,605,961 A * | 8/1986 | Frederiksen | 380/215 |
| 4,613,901 A | 9/1986 | Gilhousen et al. | |
| 4,633,309 A | 12/1986 | Li et al. | |
| 4,675,732 A | 6/1987 | Oleson | |
| 4,694,490 A | 9/1987 | Harvey et al. | |
| 4,866,769 A | 9/1989 | Karp | |
| 4,866,787 A | 9/1989 | Olesen | |
| 5,012,510 A | 4/1991 | Schaubs et al. | |
| 5,015,830 A | 5/1991 | Masuzawa et al. | |
| 5,033,084 A | 7/1991 | Beecher | |
| 5,036,461 A | 7/1991 | Elliott et al. | |
| 5,068,894 A | 11/1991 | Hoppe | |
| 5,091,618 A | 2/1992 | Takahashi | |
| 5,105,268 A | 4/1992 | Yamanouchi et al. | |
| 5,115,467 A | 5/1992 | Esserman et al. | |
| 5,132,992 A | 7/1992 | Yurt et al. | |
| 5,168,353 A | 12/1992 | Walker et al. | |
| 5,172,413 A | 12/1992 | Bradley et al. | |
| 5,191,410 A | 3/1993 | McCalley et al. | |
| 5,199,066 A | 3/1993 | Logan | |
| 5,270,809 A | 12/1993 | Gammie et al. | |
| 5,301,245 A | 4/1994 | Endoh | |
| 5,301,352 A | 4/1994 | Nakagawa et al. | |
| 5,331,139 A | 7/1994 | Lee | |
| 5,335,277 A | 8/1994 | Harvey et al. | |
| 5,357,276 A | 10/1994 | Banker et al. | |
| 5,371,551 A | 12/1994 | Logan et al. | |
| 5,381,481 A | 1/1995 | Gammie et al. | |
| 5,386,587 A | 1/1995 | Yuzawa | |
| 5,396,293 A | 3/1995 | Shellard | |
| 5,421,031 A | 5/1995 | De Bey | |
| 5,438,423 A | 8/1995 | Lynch et al. | |
| 5,440,336 A | 8/1995 | Buhro et al. | |
| 5,442,389 A | 8/1995 | Blahut et al. | |
| 5,481,609 A | 1/1996 | Cohen et al. | |
| 5,485,221 A | 1/1996 | Banker et al. | |
| 5,495,531 A | 2/1996 | Smiedt | |
| 5,504,816 A | 4/1996 | Hamilton et al. | |
| 5,505,901 A | 4/1996 | Harney et al. | |
| 5,506,902 A | 4/1996 | Kubota | |
| 5,511,986 A | 4/1996 | Casey et al. | |
| 5,557,541 A | 9/1996 | Schulhof | |
| 5,559,549 A | 9/1996 | Hendricks et al. | |
| 5,565,805 A | 10/1996 | Nakagawa et al. | |
| 5,566,353 A | 10/1996 | Cho et al. | |
| 5,583,937 A | 12/1996 | Ullrich et al. | |
| 5,586,264 A | 12/1996 | Belknap et al. | |
| 5,590,200 A | 12/1996 | Nachman et al. | |
| 5,592,212 A | 1/1997 | Handelman | |
| 5,592,551 A | 1/1997 | Lett et al. | |
| 5,592,651 A | 1/1997 | Rackman | |
| 5,594,491 A | 1/1997 | Hodge et al. | |
| 5,619,247 A | 4/1997 | Russo | |
| 5,630,204 A | 5/1997 | Hylton et al. | |
| 5,640,453 A | 6/1997 | Schuchman et al. | |
| 5,642,418 A | 6/1997 | Farris et al. | |
| 5,661,517 A | 8/1997 | Budow et al. | |
| 5,663,896 A | 9/1997 | Aucsmith | |
| 5,664,046 A | 9/1997 | Abecassis | |
| 5,666,645 A | 9/1997 | Thomas et al. | |
| 5,675,390 A | 10/1997 | Schindler et al. | |
| 5,677,895 A | 10/1997 | Mankovitz | |
| RE35,651 E | 11/1997 | Bradley et al. | |
| 5,684,742 A | 11/1997 | Bublitz et al. | |
| 5,699,429 A | 12/1997 | Tamer et al. | |
| 5,701,383 A | 12/1997 | Russo et al. | |
| 5,701,582 A | 12/1997 | De Bey | |
| 5,708,963 A | 1/1998 | Mobley et al. | |
| 5,710,970 A | 1/1998 | Walters et al. | |
| 5,715,315 A | 2/1998 | Handelman | |
| 5,715,403 A | 2/1998 | Stefik | |
| 5,721,829 A | 2/1998 | Dunn et al. | |
| 5,724,646 A | 3/1998 | Ganek et al. | |
| 5,729,000 A | 3/1998 | Sugimoto | |
| 5,729,280 A | 3/1998 | Inoue et al. | |
| 5,734,853 A | 3/1998 | Hendricks et al. | |
| 5,748,732 A | 5/1998 | Le Berre et al. | |
| 5,761,302 A | 6/1998 | Park | |
| 5,764,762 A | 6/1998 | Kazmierczak et al. | |
| 5,784,095 A | 7/1998 | Robbins et al. | |
| 5,787,172 A | 7/1998 | Arnold | |
| 5,790,663 A | 8/1998 | Lee et al. | |
| 5,790,783 A | 8/1998 | Lee et al. | |
| 5,793,413 A | 8/1998 | Hylton et al. | |
| 5,793,971 A | 8/1998 | Fujita et al. | |
| 5,805,699 A | 9/1998 | Akiyama et al. | |
| 5,818,934 A | 10/1998 | Cuccia | |
| 5,826,165 A | 10/1998 | Echeita et al. | |
| 5,831,664 A | 11/1998 | Wharton et al. | |
| 5,845,240 A | 12/1998 | Fielder | |
| 5,850,218 A | 12/1998 | LaJoie et al. | |
| 5,864,747 A | 1/1999 | Clark et al. | |
| 5,867,207 A | 2/1999 | Chaney et al. | |
| 5,870,474 A | 2/1999 | Wasilewski et al. | |
| 5,872,353 A | 2/1999 | Reichardt et al. | |
| 5,889,941 A | 3/1999 | Tushie et al. | |
| 5,892,535 A | 4/1999 | Allen et al. | |
| 5,898,159 A | 4/1999 | Huang | |
| 5,898,919 A | 4/1999 | Yuen | |
| 5,899,582 A | 5/1999 | Dulac | |
| 5,912,969 A | 6/1999 | Sasamoto et al. | |
| 5,914,941 A | 6/1999 | Janky | |
| 5,926,205 A | 7/1999 | Krause et al. | |
| 5,930,215 A | 7/1999 | Fite et al. | |
| 5,930,802 A * | 7/1999 | Lee | 707/104.1 |
| 5,933,500 A | 8/1999 | Blatter et al. | |
| 5,936,222 A | 8/1999 | Korsunsky et al. | |
| 5,936,660 A | 8/1999 | Gurantz | |
| 5,937,067 A | 8/1999 | Thatcher et al. | |
| 5,953,418 A | 9/1999 | Bock et al. | |
| 5,966,186 A | 10/1999 | Shigihara et al. | |
| 5,973,756 A | 10/1999 | Erlin | |
| 5,978,649 A | 11/1999 | Kahn et al. | |
| 5,987,501 A * | 11/1999 | Hamilton et al. | 709/203 |
| 5,999,628 A | 12/1999 | Chan | |
| 5,999,629 A | 12/1999 | Heer et al. | |
| 6,005,937 A | 12/1999 | Lee | |
| 6,006,987 A | 12/1999 | Hoolhorst | |
| 6,011,511 A | 1/2000 | Chuong et al. | |
| 6,025,868 A | 2/2000 | Russo | |
| 6,038,000 A | 3/2000 | Hurst, Jr. | |
| 6,038,319 A | 3/2000 | Chari | |
| 6,041,056 A | 3/2000 | Bigham et al. | |
| 6,055,314 A | 4/2000 | Spies | |
| 6,055,566 A | 4/2000 | Kikinis | |
| 6,061,449 A | 5/2000 | Candelore et al. | |
| 6,061,451 A | 5/2000 | Muratani et al. | |
| 6,061,452 A | 5/2000 | Suzuki | |
| 6,064,724 A | 5/2000 | Kelly | |
| 6,069,647 A | 5/2000 | Sullivan et al. | |
| 6,072,873 A | 6/2000 | Bewick | |
| 6,072,982 A | 6/2000 | Haddad | |
| 6,075,330 A | 6/2000 | Terk | |
| 6,091,883 A | 7/2000 | Artigalas et al. | |
| 6,097,441 A | 8/2000 | Allport | |
| 6,105,134 A | 8/2000 | Pinder et al. | |
| 6,105,868 A | 8/2000 | Reichardt | |
| 6,141,531 A | 10/2000 | Williams et al. | |
| 6,144,400 A | 11/2000 | Ebisawa | |
| 6,148,081 A | 11/2000 | Szymanski et al. | |
| 6,148,400 A | 11/2000 | Arnold | |
| 6,154,206 A | 11/2000 | Ludtke | |
| 6,157,719 A | 12/2000 | Wasilewski et al. | |
| 6,157,949 A | 12/2000 | Cheng et al. | |
| 6,163,284 A | 12/2000 | Munarata | |
| 6,169,879 B1 | 1/2001 | Perlman | |
| 6,178,242 B1 | 1/2001 | Tsuria | |
| 6,202,211 B1 | 3/2001 | Williams, Jr. | |

(56) References Cited

U.S. PATENT DOCUMENTS

| | | |
|---|---|---|
| 6,216,266 B1 | 4/2001 | Eastman et al. |
| 6,226,618 B1 | 5/2001 | Downs et al. |
| 6,229,895 B1 | 5/2001 | Son et al. |
| 6,240,401 B1 | 5/2001 | Oren et al. |
| 6,263,504 B1 | 7/2001 | Ebisawa |
| 6,266,481 B1 | 7/2001 | Lee et al. |
| 6,267,295 B1 | 7/2001 | Amagai et al. |
| 6,275,991 B1 | 8/2001 | Erlin |
| 6,286,142 B1 | 9/2001 | Ehreth |
| 6,288,716 B1 | 9/2001 | Humpleman et al. |
| 6,289,455 B1 | 9/2001 | Kocher et al. |
| 6,292,568 B1 | 9/2001 | Akins, III et al. |
| 6,298,441 B1 | 10/2001 | Handelman et al. |
| 6,317,883 B2 | 11/2001 | Marics |
| 6,317,884 B1 | 11/2001 | Eames et al. |
| D454,875 S | 3/2002 | McDowell et al. |
| 6,370,688 B1 | 4/2002 | Hejna |
| 6,374,336 B1 * | 4/2002 | Peters et al. ............... 711/167 |
| 6,381,747 B1 | 4/2002 | Wonfor et al. |
| 6,385,596 B1 * | 5/2002 | Wiser et al. ............... 705/51 |
| 6,398,245 B1 | 6/2002 | Gruse et al. |
| 6,405,372 B1 | 6/2002 | Kim |
| 6,415,031 B1 | 7/2002 | Colligan et al. |
| 6,418,421 B1 | 7/2002 | Hurtado et al. |
| 6,418,424 B1 | 7/2002 | Hoffberg et al. |
| 6,424,947 B1 | 7/2002 | Tsuria et al. |
| 6,437,836 B1 | 8/2002 | Huang et al. |
| 6,442,525 B1 | 8/2002 | Silverbrook et al. |
| 6,456,985 B1 | 9/2002 | Ohtsuka |
| 6,466,671 B1 | 10/2002 | Maillard et al. |
| 6,466,921 B1 | 10/2002 | Corderu et al. |
| 6,473,858 B1 | 10/2002 | Shimomura et al. |
| 6,476,825 B1 | 11/2002 | Croy et al. |
| 6,480,667 B1 | 11/2002 | O'Connor |
| 6,487,663 B1 | 11/2002 | Jaisimha et al. |
| 6,487,722 B1 | 11/2002 | Okura et al. |
| 6,496,980 B1 | 12/2002 | Tillman et al. |
| 6,502,139 B1 | 12/2002 | Birk et al. |
| 6,510,519 B2 | 1/2003 | Wasilewski et al. |
| 6,516,412 B2 | 2/2003 | Wasilewski et al. |
| 6,516,465 B1 | 2/2003 | Paskins |
| 6,519,693 B1 * | 2/2003 | Debey ............... 712/201 |
| 6,519,772 B1 | 2/2003 | Bopardikar |
| 6,523,114 B1 * | 2/2003 | Barton ............... 713/176 |
| 6,530,085 B1 | 3/2003 | Perlman |
| 6,539,548 B1 | 3/2003 | Hendricks et al. |
| 6,542,870 B1 | 4/2003 | Matsumoto |
| 6,543,053 B1 * | 4/2003 | Li et al. ............... 725/88 |
| 6,550,011 B1 | 4/2003 | Sims, III |
| 6,560,340 B1 | 5/2003 | Akins, III et al. |
| 6,574,609 B1 | 6/2003 | Downs et al. |
| 6,588,673 B1 | 7/2003 | Chan et al. |
| 6,591,419 B2 | 7/2003 | Barry et al. |
| 6,611,812 B2 | 8/2003 | Hurtado et al. |
| 6,622,307 B1 | 9/2003 | Ho |
| 6,637,027 B1 | 10/2003 | Breslauer et al. |
| 6,654,547 B1 | 11/2003 | Maeda et al. |
| 6,655,580 B1 | 12/2003 | Ergo et al. |
| 6,668,377 B1 | 12/2003 | Dunn |
| 6,681,326 B2 | 1/2004 | Son et al. |
| 6,687,683 B1 | 2/2004 | Harada et al. |
| 6,697,489 B1 | 2/2004 | Candelore |
| 6,701,528 B1 | 3/2004 | Arsenault et al. |
| 6,714,650 B1 | 3/2004 | Maillard et al. |
| 6,741,834 B1 | 5/2004 | Godwin |
| 6,745,245 B1 | 6/2004 | Carpenter |
| 6,748,080 B2 | 6/2004 | Russ et al. |
| 6,754,827 B1 | 6/2004 | Cane et al. |
| 6,754,904 B1 | 6/2004 | Cooper et al. |
| 6,766,451 B1 | 7/2004 | Van Rijnsoever |
| 6,772,133 B1 | 8/2004 | Kambayashi et al. |
| 6,772,434 B1 | 8/2004 | Godwin |
| 6,804,357 B1 | 10/2004 | Ikonen et al. |
| 6,810,387 B1 | 10/2004 | Yim |
| 6,816,970 B2 | 11/2004 | Morgan et al. |
| 6,834,111 B1 | 12/2004 | Nishimura et al. |
| 6,851,055 B1 * | 2/2005 | Boyle et al. ............... 713/193 |
| 6,853,728 B1 | 2/2005 | Kahn et al. |
| 6,862,582 B2 | 3/2005 | Harada et al. |
| 6,889,208 B1 | 5/2005 | Okabe et al. |
| 6,904,522 B1 | 6/2005 | Benardeau et al. |
| 6,912,513 B1 | 6/2005 | Candelore |
| 6,934,963 B1 | 8/2005 | Reynolds et al. |
| 6,961,858 B2 | 11/2005 | Fransdonk |
| 6,987,854 B2 | 1/2006 | Maillard |
| 6,993,499 B2 | 1/2006 | Gagnon et al. |
| 7,035,827 B2 | 4/2006 | Ezaki |
| 7,096,271 B1 * | 8/2006 | Omoigui et al. ............... 709/231 |
| 7,111,115 B2 * | 9/2006 | Peters et al. ............... 711/112 |
| 7,191,155 B2 | 3/2007 | Maruyama et al. |
| 7,191,335 B1 | 3/2007 | Maillard |
| 7,240,359 B1 | 7/2007 | Sie et al. |
| 7,370,342 B2 * | 5/2008 | Ismail et al. ............... 725/46 |
| 7,487,309 B2 * | 2/2009 | Peters et al. ............... 711/162 |
| 7,549,058 B1 * | 6/2009 | Wang et al. ............... 713/189 |
| 7,660,947 B2 * | 2/2010 | Peters et al. ............... 711/114 |
| 7,774,623 B2 * | 8/2010 | Tan et al. ............... 713/193 |
| 7,876,998 B2 | 1/2011 | Wall et al. |
| 7,917,696 B2 * | 3/2011 | Peters et al. ............... 711/114 |
| 7,945,587 B2 * | 5/2011 | Hardy ............... 707/793 |
| 2001/0001876 A1 | 5/2001 | Morgan et al. |
| 2001/0056576 A1 | 12/2001 | Park et al. |
| 2002/0001386 A1 * | 1/2002 | Akiyama ............... 380/201 |
| 2002/0013948 A1 | 1/2002 | Aguayo, Jr. et al. |
| 2002/0021805 A1 | 2/2002 | Schumann et al. |
| 2002/0023219 A1 | 2/2002 | Treffers et al. |
| 2002/0046339 A1 * | 4/2002 | Bellare et al. ............... 713/170 |
| 2002/0046359 A1 * | 4/2002 | Boden ............... 714/6 |
| 2002/0056112 A1 | 5/2002 | Dureau et al. |
| 2002/0083438 A1 * | 6/2002 | So et al. ............... 725/31 |
| 2002/0100052 A1 | 7/2002 | Daniels |
| 2002/0101991 A1 | 8/2002 | Bacon et al. |
| 2002/0112235 A1 | 8/2002 | Ballou et al. |
| 2002/0112243 A1 | 8/2002 | Hunter et al. |
| 2002/0116705 A1 | 8/2002 | Perlman et al. |
| 2002/0162047 A1 * | 10/2002 | Peters et al. ............... 714/5 |
| 2002/0166121 A1 | 11/2002 | Rovira |
| 2002/0170054 A1 * | 11/2002 | Kudelski et al. ............... 725/31 |
| 2002/0170072 A1 | 11/2002 | Lundbald et al. |
| 2002/0178452 A1 | 11/2002 | LeComte |
| 2002/0184628 A1 * | 12/2002 | Kim et al. ............... 725/41 |
| 2002/0184638 A1 * | 12/2002 | Agnihotri et al. ............... 725/89 |
| 2003/0005285 A1 | 1/2003 | Graunke |
| 2003/0005429 A1 | 1/2003 | Colsey |
| 2003/0009773 A1 * | 1/2003 | Carlson ............... 725/142 |
| 2003/0018968 A1 | 1/2003 | Avnet |
| 2003/0018980 A1 * | 1/2003 | Gorbatov et al. ............... 725/133 |
| 2003/0040962 A1 | 2/2003 | Lewis |
| 2003/0061477 A1 | 3/2003 | Kahn et al. |
| 2003/0070167 A1 | 4/2003 | Holtz et al. |
| 2003/0081131 A1 | 5/2003 | Farnan et al. |
| 2003/0088876 A1 | 5/2003 | Mao et al. |
| 2003/0110132 A1 | 6/2003 | Sako |
| 2003/0115449 A1 * | 6/2003 | Yochim ............... 713/153 |
| 2003/0122966 A1 | 7/2003 | Markman et al. |
| 2003/0131349 A1 | 7/2003 | Kuczynski-Brown |
| 2003/0145183 A1 | 7/2003 | Muehring |
| 2003/0149869 A1 * | 8/2003 | Gleichauf ............... 713/153 |
| 2003/0156649 A1 | 8/2003 | Abrams, Jr. |
| 2003/0161302 A1 * | 8/2003 | Zimmermann et al. ...... 370/363 |
| 2003/0174844 A1 | 9/2003 | Candelore |
| 2003/0177365 A1 | 9/2003 | Buhan et al. |
| 2003/0196113 A1 | 10/2003 | Brown et al. |
| 2003/0196204 A1 | 10/2003 | Thiagarajan et al. |
| 2003/0208771 A1 | 11/2003 | Mensgen et al. |
| 2003/0228911 A1 | 12/2003 | Dernis et al. |
| 2003/0229898 A1 | 12/2003 | Babu et al. |
| 2003/0229900 A1 | 12/2003 | Reisman |
| 2004/0003173 A1 * | 1/2004 | Yao et al. ............... 711/114 |
| 2004/0024580 A1 * | 2/2004 | Salmonsen et al. ............... 703/27 |
| 2004/0025179 A1 | 2/2004 | Russ et al. |
| 2004/0032950 A1 | 2/2004 | Graunke |
| 2004/0068721 A1 * | 4/2004 | O'Neill et al. ............... 717/168 |
| 2004/0073954 A1 | 4/2004 | Bjordammen et al. |

(56) References Cited

U.S. PATENT DOCUMENTS

| | | | |
|---|---|---|---|
| 2004/0088558 A1 | 5/2004 | Candelore | |
| 2004/0126093 A1 | 7/2004 | Platt et al. | |
| 2004/0128682 A1 | 7/2004 | Liga et al. | |
| 2004/0148634 A1 | 7/2004 | Arsenault et al. | |
| 2004/0168071 A1 | 8/2004 | Silverbrook | |
| 2004/0190721 A1 | 9/2004 | Barrett et al. | |
| 2004/0205812 A1 | 10/2004 | Candelore | |
| 2004/0216164 A1* | 10/2004 | Hayhurst | 725/86 |
| 2004/0260798 A1 | 12/2004 | Addington et al. | |
| 2004/0261126 A1 | 12/2004 | Addington et al. | |
| 2005/0005286 A1 | 1/2005 | Koskela et al. | |
| 2005/0005300 A1 | 1/2005 | Putterman et al. | |
| 2005/0039025 A1 | 2/2005 | Main et al. | |
| 2005/0050333 A1 | 3/2005 | Yeap et al. | |
| 2005/0061884 A1 | 3/2005 | Stewart | |
| 2005/0071280 A1 | 3/2005 | Irwin et al. | |
| 2005/0084102 A1 | 4/2005 | Hollar | |
| 2005/0086696 A1* | 4/2005 | Daniels | 725/88 |
| 2005/0091681 A1 | 4/2005 | Borden et al. | |
| 2005/0107157 A1 | 5/2005 | Wachtfogel et al. | |
| 2005/0108519 A1 | 5/2005 | Barton et al. | |
| 2005/0120386 A1 | 6/2005 | Stone | |
| 2005/0144468 A1 | 6/2005 | Northcutt et al. | |
| 2005/0169468 A1 | 8/2005 | Fahrny et al. | |
| 2005/0182931 A1 | 8/2005 | Robert et al. | |
| 2005/0183112 A1 | 8/2005 | Duval | |
| 2005/0195975 A1 | 9/2005 | Kawakita | |
| 2005/0204391 A1 | 9/2005 | Hunleth et al. | |
| 2005/0216942 A1* | 9/2005 | Barton | 725/97 |
| 2005/0235361 A1 | 10/2005 | Alkove et al. | |
| 2005/0249350 A1 | 11/2005 | Kahn et al. | |
| 2005/0262573 A1* | 11/2005 | Bo et al. | 726/27 |
| 2005/0289064 A1 | 12/2005 | LeComte et al. | |
| 2006/0064383 A1 | 3/2006 | Marking | |
| 2006/0085835 A1 | 4/2006 | Istvan et al. | |
| 2006/0122946 A1* | 6/2006 | Fahrny et al. | 705/71 |
| 2006/0126833 A1* | 6/2006 | O'Leary et al. | 380/30 |
| 2006/0168663 A1 | 7/2006 | Viljoen et al. | |
| 2006/0179489 A1 | 8/2006 | Mas Ribes | |
| 2006/0195881 A1* | 8/2006 | Segev et al. | 725/116 |
| 2006/0212928 A1* | 9/2006 | Maino et al. | 726/4 |
| 2006/0218620 A1* | 9/2006 | Nadarajah et al. | 725/151 |
| 2006/0242155 A1* | 10/2006 | Moore et al. | 707/10 |
| 2007/0009235 A1* | 1/2007 | Walters et al. | 386/112 |
| 2007/0016717 A1* | 1/2007 | Peters et al. | 711/114 |
| 2007/0050590 A1* | 3/2007 | Syed et al. | 711/170 |
| 2007/0058924 A1* | 3/2007 | Yeh | 386/46 |
| 2007/0083886 A1 | 4/2007 | Kauffman et al. | |
| 2007/0100891 A1 | 5/2007 | Nee | |
| 2007/0118606 A1* | 5/2007 | Duncan et al. | 709/217 |
| 2007/0219918 A1* | 9/2007 | Schull | 705/59 |
| 2007/0245010 A1* | 10/2007 | Arn et al. | 709/223 |
| 2007/0288638 A1* | 12/2007 | Vuong et al. | 709/226 |
| 2007/0294422 A1* | 12/2007 | Zuckerman et al. | 709/230 |
| 2008/0019529 A1* | 1/2008 | Kahn et al. | 380/281 |
| 2008/0022297 A1 | 1/2008 | Walter et al. | |
| 2008/0168523 A1* | 7/2008 | Ansari et al. | 725/131 |
| 2008/0172593 A1* | 7/2008 | Rainish et al. | 714/776 |
| 2008/0288998 A1* | 11/2008 | Locket et al. | 725/151 |
| 2008/0301738 A1 | 12/2008 | Davies et al. | |
| 2009/0080653 A1* | 3/2009 | Candelore et al. | 380/200 |
| 2009/0106802 A1* | 4/2009 | Zuckerman et al. | 725/91 |
| 2010/0027550 A1 | 2/2010 | Candelore et al. | |
| 2013/0035778 A1 | 2/2013 | Jobs et al. | |

FOREIGN PATENT DOCUMENTS

| | | |
|---|---|---|
| EP | 0936812 | 8/1999 |
| EP | 0975165 | 1/2000 |
| EP | 0989557 | 3/2000 |
| EP | 1122910 | 8/2001 |
| EP | 1304871 | 4/2003 |
| EP | 1418701 | 5/2004 |
| JP | 04-175025 | 6/1992 |
| JP | 05-284499 | 10/1993 |
| JP | 06-351023 | 12/1994 |
| JP | 08-125651 | 5/1996 |
| JP | 10-013784 | 1/1998 |
| JP | 11-136708 | 5/1999 |
| JP | 11220444 | 8/1999 |
| JP | 11284584 | 10/1999 |
| JP | 2000-122539 | 4/2000 |
| WO | WO 91/11884 | 8/1991 |
| WO | WO 98/56180 | 12/1998 |
| WO | WO 99/18729 | 4/1999 |
| WO | WO 99/43120 | 8/1999 |
| WO | WO 00/13412 | 3/2000 |
| WO | WO 00/14967 | 3/2000 |
| WO | WO 00/19294 | 4/2000 |
| WO | WO 00/30354 | 5/2000 |
| WO | WO 01/22724 | 3/2001 |
| WO | WO 01/37546 | 5/2001 |
| WO | WO 01/82600 | 11/2001 |
| WO | WO 01/98920 | 12/2001 |
| WO | WO 02/063879 | 8/2002 |
| WO | WO 03/101105 | 12/2003 |
| WO | WO 03/103293 | 12/2003 |
| WO | WO 2004/017637 | 2/2004 |
| WO | WO 2004/057871 | 7/2004 |
| WO | WO 2004/082286 | 9/2004 |

OTHER PUBLICATIONS

Non-final Office Action dated Jan. 18, 2008 in U.S. Appl. No. 10/759,679, filed Jan. 19, 2004 by Arsenault et al.

Notice of Allowance dated Dec. 5, 2007 in U.S. Appl. No. 09/620,833, filed Jul. 21, 2000 by Kahn et al.

Notice of Allowance dated Dec. 10, 2007 in U.S. Appl. No. 09/960,824, filed Sep. 21, 2001 by Kahn et al.

Non-final Office Action dated Dec. 4, 2007 in U.S. Appl. No. 10/758,811, filed Jan. 16, 2004 by Kahn et al.

Final Office Action dated Jan. 23, 2008 in U.S. Appl. No. 09/620,772, filed Jul. 21, 2000 by Kahn et al.

"PKCS #1 v2.1: RSA Cryptography Standard"; Jun. 14, 2002; RSA Laboratories; 61 pages.

Ma, Huadong; Shin, Kang G.; "Multicast Video on Demand Services"; ACM SIGCOMM Computer Communication Review; vol. 32, Issue 1; Jan. 2002; pp. 31-43; ACM Press; New York, New York.

Tantaoui, Mounir A., Hua, Kien A., Sheu, Simon; "Interaction with Broadcast Video"; International Multimedia Conference Proceedings of the 10th ACM International Conference on Multimedia; pp. 29-38; ACM Press; New York, New York; 2002; ISBN: 1-58113-620-X.

Griwodz, Carsten; Merkel, Oliver; Dittmann, Jana; Steinmetz, Ralf; "Protecting Vo D The Easier Way"; International Multimedia Conference Proceedings of the 6th ACM International Conference on Multimedia; pp. 21-28; ACM Press; New York, New York; 2002; ISBN: 0-201-30990-4.

U.S. Appl. No. 09/620,772, filed Jul. 21, 2000, Kahn et al.

U.S. Appl. No. 09/620,773, filed Jul. 21, 2000, Kahn et al.

U.S. Appl. No. 09/620,883, filed Jul. 21, 2000, Kahn et al.

U.S. Appl. No. 09/621,476, filed Jul. 21, 2000, Kahn et al.

U.S. Appl. No. 11/205,249, filed Aug. 16, 2005, James et al.

U.S. Appl. No. 60/707,387, filed Aug. 11, 2005, Kahn et al.

"PocketTV Brings Video to Palm-size PC", Mar. 9, 2000[online][retrieved on Apr. 16, 2003] Retrieved from the Internet Archive (WayBack Machine) using Internet <URL: http://web.archieve.org/web/20000816034339/www.palmsizepc.com/mar2000-14-1.html>.

"HP Jornada 430/430se Palm-size PC: User's Guide", Hewlett Packard, 1999, pp. 7-9.

"HP Jornada 430/430se Palm-size PC: User's Guide-Chapter 6", Hewlett Packard, 1999, pp. 43-54.

P. Venkat Rangan, et al., *Designing An On-Demand Multimedia Service*, IEEE Communications Magazine, Jul. 1992, vol. 30, No. 7, title page and pp. 56-64.

Wanjiun Liao, et al., *The Split and Merge Protocol for Interactive Video-On-Demand*, IEEE MultiMedia, Oct.-Dec. 1997, vol. 4, No. 4, index and pp. 51-62.

(56) References Cited

OTHER PUBLICATIONS

Robert Johnston, et al., *A Digital Television Sequence Store*, IEEE Transactions on Communications, May 1978, vol. Com-26, No. 5, index and pp. 594-600.

*Proposed SMPTE Standard for Television—Splice Points for MPEG-2 Transport Streams*, SMPTE Journal, Oct. 1998, SMPTE 312M, pp. 916-925.

Yongchen Li, et al., *Security Enhanced MPEG Player*, IEEE, 1996, pp. 169-175.

Fink, Dan, "*Ready to Take the Dive? It's fast-forward as new DVD and Divx formats hit market (includes graphic: Home video: the next generation plus: Some selections that show off the system)* ", York Daily Record, Dec. 21, 1998, pp. 1-3.

Sin-Joo Lee, et al., *A Survey of Watermarking Techniques Applied to Multimedia*, IEEE, 2001, pp. 272-277.

1st Report of EBU/SMPTE Task Force for Harmonized Standards for the Exchange of Television Program Material as Bit Streams, May 6, 1997, Version 1.30, pp. 1-73.

"PocketTV-MPEG movie player for Pocket PC and WinCE" [online], May 17, 2000 MPEG TV, LLC [retrieved on Mar. 26, 2004]. Retrieved from the Internet <URL: http://web.archive.org/web/200006210123803/www.mpegtv.com/wince/pockettv/index.html>.

"Download PocketTV (beta) for WinCE" [online], Nov. 3, 1999 MPEG TV, LLC [retrieved on Mar. 26, 2004]. Retrieved from the Internet <URL: http://web.archive.org/web/19991127093158/www.mpegtv.com/wince/pockettv/index.html>.

Anerousis, N., "*Skycast: The Satellite Digital Broadcast Relay Service*", ATT&T Labs Research, unpublished manuscript, 1999, pp. 1-4.

"*Introduction to Encryption Theory*", published by Kyoritsu Shuppan Co., Feb. 25, 1993.

Stephanos Androutsellis-Theotokis and Diomidis Spinellis, "A Survey of Peer-to-Peer Content Distribution Technologies", ACM Computing Surveys, vol. 36, No. 4, Dec. 2004, pp. 335-371.

"Mnet", http://en.wikipedia.org/wiki/MojoNation, downloaded on Jul. 12, 2006, 3 pages.

Bram Cohen, "Incentives Build Robustness in BitTorrent", May 22, 2003, 5 pages.

"BitTorrent", http://en.wikipedia.org/wiki/Bittorent, downloaded on Jul. 12, 2006, 13 pages.

Tsubakiyama, Hideki and Koga, Keiichiro; "Security for Information Data Broadcasting System with Conditional-Access Control"; IEEE; 1993; pp. 164-170.

EBU Project Group B/CA; "Functional Model of a Conditional Access System"; EBU Technical Review; Jun. 10, 1995; pp. 64-77.

U.S. Appl. No. 10/758,865, filed Jan. 16, 2004, Raynold M. Kahn, Non-final Office action dated Sep. 25, 2007.

U.S. Appl. No. 10/758,818, filed Jan. 16, 2004, Raynold M. Kahn, Final Rejection dated Aug. 20, 2007.

U.S. Appl. No. 10/790,466, filed Mar. 1, 2004, Stephen P. Dulac, Final Rejection dated Oct. 10, 2007.

Non-final Office Action dated Oct. 6, 2009 in U.S. Appl. No. 11/499,636, filed Aug. 4, 2006 by Michael H. Ficco.

Robin, Michael et al.; "Digital Television Fundamentals—Design and Installation of Video and Audio Systems"; Chapter 8; title page(s) and pp. 345-425; McGraw-Hill Professional; 2000.

Schneier, Bruce; "Applied Cryptography-Protocols, Algorithms, and Source Code in C"; 2nd Edition; pp. 216-222, 357-362; John Wiley & Sons; 1996.

United States Patent and Trademark Office non-final Office action dated Jan. 20, 2012 in U.S. Appl. No. 11/499,636, filed Aug. 4, 2006 by Michael H. Ficco; pp. 3-48.

United States Patent and Trademark Office Final Rejection dated Mar. 15, 2010 in U.S. Appl. No. 11/499,636, filed Aug. 4, 2006 by Michael H. Ficco; pp. 2-52.

Final Rejection dated Jul. 20, 2012 in U.S. Appl. No. 11/499,636, filed Aug. 4, 2006 by Michael Ficco.

Final Rejection dated May 30, 2014 in U.S. Appl. No. 11/499,636, filed Aug. 4, 2006 by Michael Ficco; pp. 1-41.

Non-final Office action dated Sep. 11, 2013 in U.S. Appl. No. 11/499,636, filed Aug. 4, 2006 by Michael Ficco; 1-54 pages.

Non-final Office action dated Jan. 21, 2015 in U.S. Appl. No. 11/499,636, filed Aug. 4, 2006 by Michael H. Ficco; total 51 pages (cover, Office Action Summary, pp. 2-49).

Notice of Allowance dated Aug. 26, 2015 in U.S. Appl. No. 11/499,636, filed Aug. 4, 2006 by Michael H. Ficco; 15 pages total.

\* cited by examiner

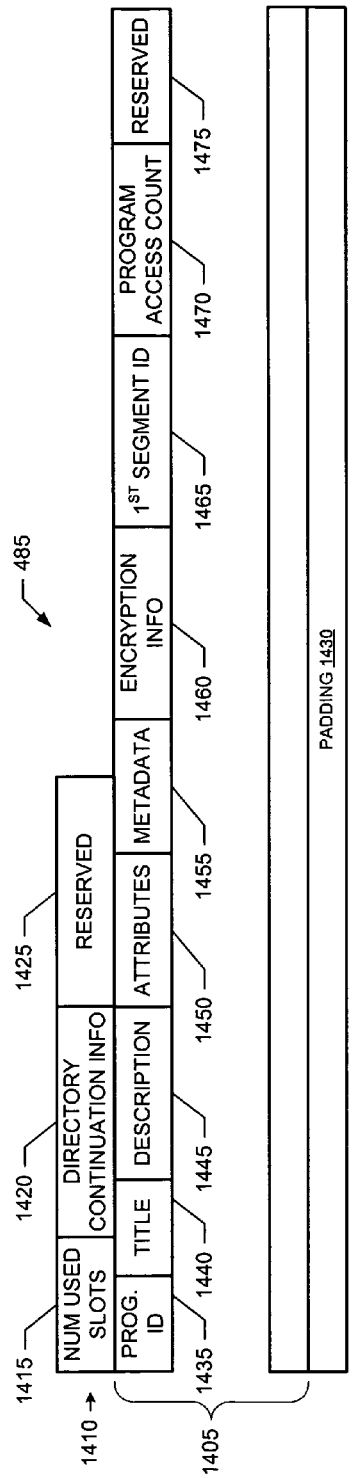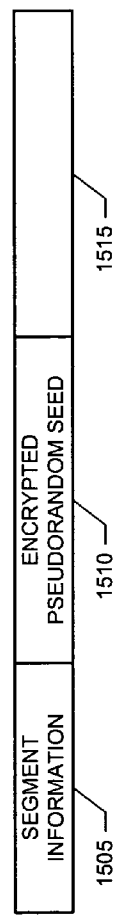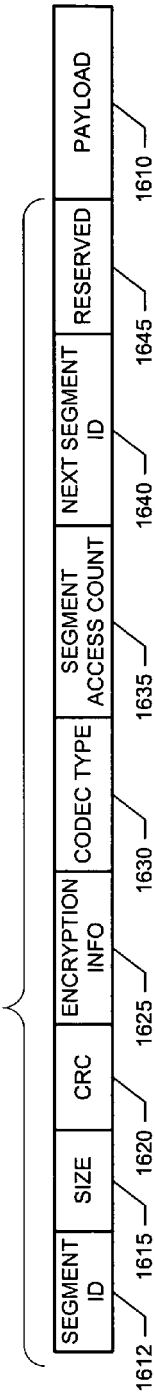
FIG. 14
FIG. 15
FIG. 16

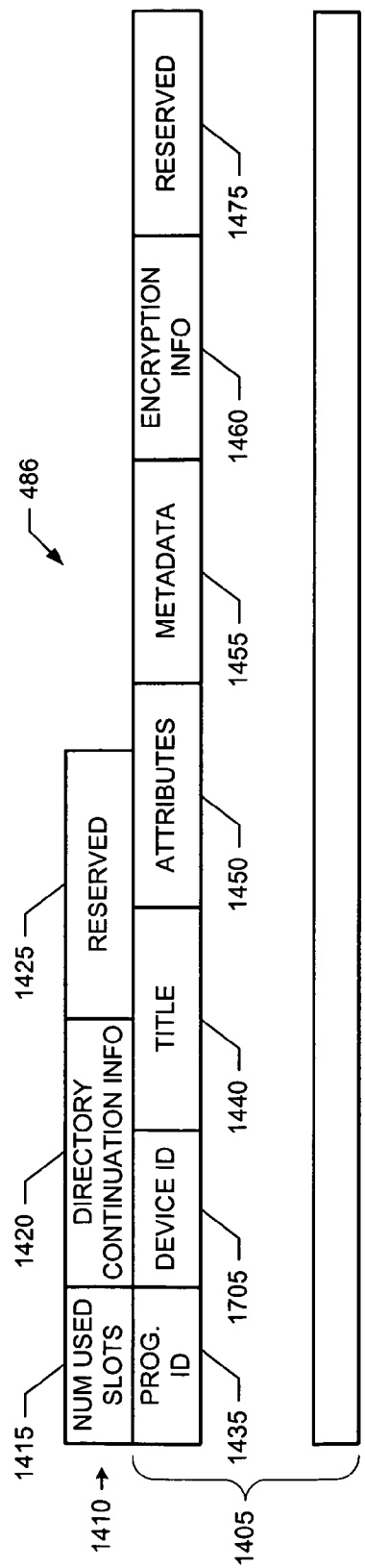
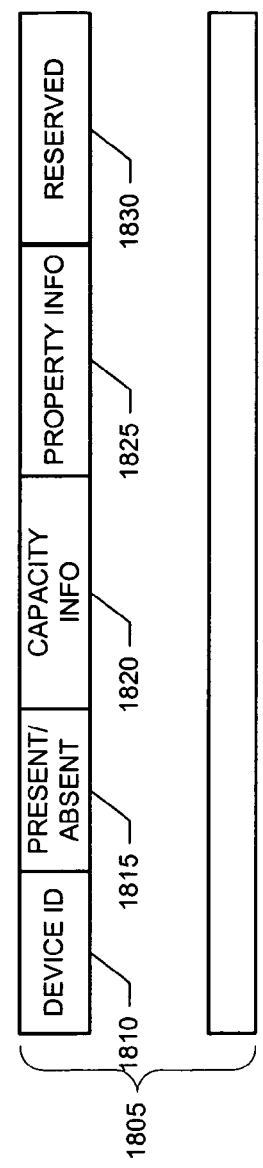
FIG. 17
FIG. 18

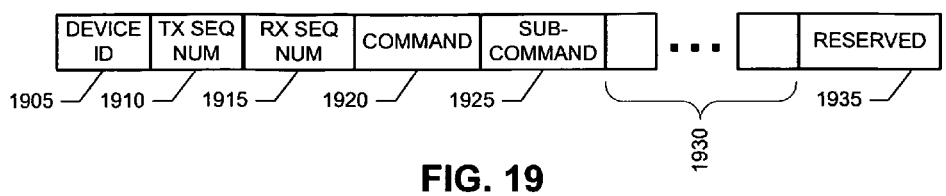

FIG. 19

| MESSAGE TYPE | COMMAND | SUB-COMMAND | PARAMETER(S) | |
|---|---|---|---|---|
| PROBE | RESPOND | NULL | UNUSED | ← 2020 |
| ANNOUNCE/ RESPOND | I AM HERE | DEVICE ID | CAPACITY INFO AND PROPERTY INFO | ← 2025 |
| OFFLINE | GOING OFFLINE | DEVICE ID | UNUSED | ← 2030 |
| DELETE | DELETE ME | DEVICE ID | UNUSED | ← 2035 |
| DIRECTORY REQUEST | SEND DIRECTORY | NULL | UNUSED | ← 2040 |
| DIRECTORY RESPONSE | MY DIRECTORY | DEVICE ID | THE DIRECTORY | ← 2045 |
| DIRECTORY MOD. | DIRECTORY CHANGE | ADD/DELETE/ MODIFY | REVISED DIRECTORY SLOT | ← 2055 |

FIG. 20

DISTRIBUTED MEDIA-PROTECTION SYSTEMS AND METHODS TO OPERATE THE SAME

FIELD OF THE DISCLOSURE

This disclosure relates generally to media systems and, more particularly, to distributed media-protection systems and methods to operate the same.

BACKGROUND

The ever increasing proliferation and/or availability of media players (e.g., personal computers, digital video recorders (DVRs), home media centers, game playing systems, etc.) creates a strong demand for systems, devices and/or methods to download and/or receive video, audio and/or multimedia data, files and/or assets. Additionally, more recently available media devices are capable of being communicatively coupled to other media devices to facilitate sharing and/or transferring of media video, audio and/or multimedia data, files and/or assets.

BRIEF DESCRIPTION OF THE DRAWINGS

FIG. 14 is an example data structure for the example media directory of FIG. 4.

FIG. 15 is an example data structure for metadata.

FIG. 16 is an example data structure for storing media segments.

FIG. 17 is an example data structure for the example universal directory of FIG. 4.

FIG. 18 is an example data structure for the example device list of FIG. 4.

FIG. 19 is an example message format.

FIG. 20 is a list of example message types and parameters that may be sent using the example message format of FIG. 19.

DETAILED DESCRIPTION

Figure 1:
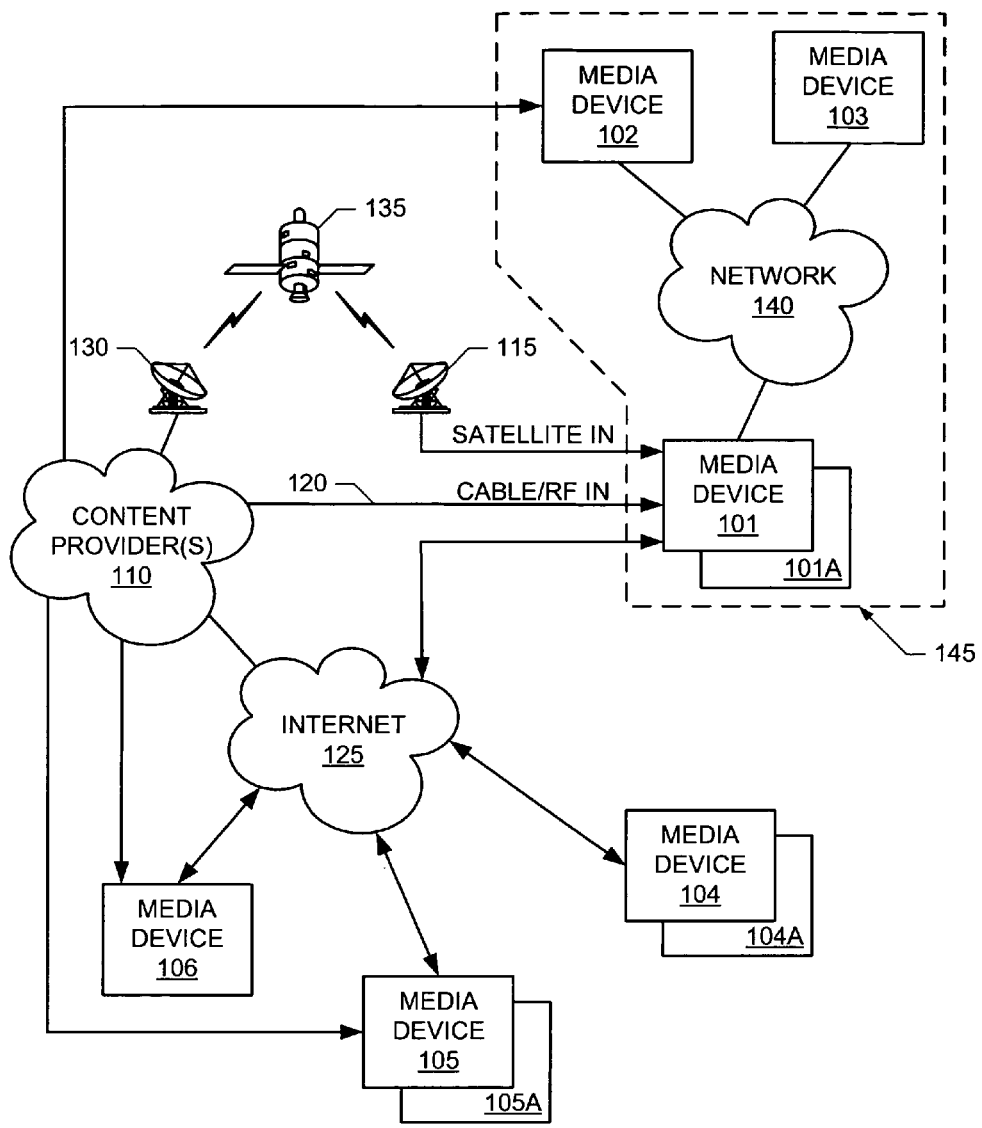
FIG. 1 is a schematic illustration of an example disclosed distributed media-protection and/or media-aggregation system.

While the following disclosure is made with respect to the delivery of video media (e.g., television (TV), movies, music videos, pay-per-view (PPV) programs, etc.), it should be understood that the systems and methods disclosed herein could also be used for delivery of any media content type, for example, audio, music, data files, web pages, etc. Additionally, throughout this disclosure reference is made to media, content, data, information, programs, movies, assets, video data, etc., however, it will be readily apparent to persons of ordinary skill in the art that these terms are substantially equivalent in reference to the example systems and/or methods disclosed herein.

The following terms will be used herein. "Title" will be used to refer to, for example, a movie itself and not the name of the movie.

"Piece of media" will be used to refer to, for example, a particular movie, a particular TV show, a particular video, etc. in its entirety.

"Media segment" will be used to refer to a portion of a piece of media such as, for example, a segment of a TV show occurring between commercials or a commercial break interval, an episode of a TV show, a portion of a move, or a commercial. In at least some examples, media segments of a particular piece of media are defined by the metadata associated with the piece of media. An example metadata data structure is discussed below in connection with FIG. 15.

"Media slices" will be used to refer to portions of a piece of media used to facilitate the distributed media-protection systems and method disclosed herein. Media slices generally represent smaller portions of a piece of media than media segments, but need not be smaller.

"Media slice" refers to a particular one of the media slices that make up a piece of media.

"Super-program" refers to a collection of media segments aggregated together to form a possibly unique, customized and/or alternative version of a piece of media. An example super-program is formed by selecting one or more commercials (i.e., media segments) based upon, for example, a user profile and then inserting the selected commercials into one or more commercial breaks (i.e., media segment slots) within a TV program thereby facilitating targeted advertising. Another example super-program is formed by the selection of one or more additional and/or alternative media segments by, for example, a user to form a customized piece of media such as, for example, a movie with a different ending, a missing piece of a recorded TV show, or a collection of situational comedy shows (a.k.a. sitcoms).

"Media stream" refers to any sequence of one or more bits representative of media. A media stream may represent any or all of a piece of media, one or more portions of media, one or more media segments, one or more media slices and/or one or more super-programs. Any number of media streams may be present in a media device. Further, one or more media streams of a media device and/or media may represent the same and/or different portions of media. For example, a decoder may have an input media stream and an output media stream that both represent the same media, albeit possibly time shifted with respect to each other. A data rate associated a media stream may be smaller, greater and/or substantially similar to a data rata associated with the media represented by the media stream. Moreover, a media stream may be stored, processed, received, transmitted, sliced, segmented, collected, aggregated, decoded, played back, encrypted and/or decrypted as disclosed herein.

FIG. 1 illustrates an example disclosed distributed media system for protecting and/or aggregating media. The example system of FIG. 1 includes any of a number of media devices, six (6) of which are illustrated in FIG. 1 with reference numerals 101, 102, 103, 104, 105 and 106. Example media devices 101-106 include, but are not limited to, set top boxes (STB), digital video recorders (DVR), video cassette recorders (VCR), personal computers (PC), game consoles, televisions (TV), media players such as iPods, cell phones, residential gateways, content delivery and/or distribution servers, advertisement servers, home media servers, home media centers, satellite receivers, cable TV receivers (analog or digital), etc.

Each of the example media devices 101-106 of FIG. 1 has an associated unique device identifier. Example device identifiers include a serial number or the media access control (MAC) address or Internet Protocol (IP) address of a network interface implemented by, within and/or coupled to a media device 101-106. In addition to the distributed media-protection and/or super-program aggregation disclosed herein, the example media devices 101-106 can implement any of a variety of additional, alternative and/or simultaneous media device functions such as present a program guide, display a TV show or play a movie from a digital versatile disc (DVD). Example manners of implementing any of the example media devices 101-106 are discussed below in connection with FIGS. 2 and 3.

To facilitate review, viewing, display and/or playback of pieces of media, a display device such as, for example, a television set or a computer monitor, may be coupled to any of the example media devices 101-106. Alternatively, the example media devices 101-106 may include their own dedicated display device(s).

In one example, the illustrated system of FIG. 1 protects media by distributing media slices and/or media segments of a piece of media across two or more of the example media devices 101-106 such that none of the media devices 101-106 stores and/or retains the entire piece of media. Example processes that may be carried out to slice and/or identify one or more portions of a piece of media and/or distribute media slices are discussed below in connection with FIGS. 8 and 9. In the example system of FIG. 1, media slices are distributed in a substantially random or pseudorandom fashion to thwart attempts to steal pieces of media in an attempt to reproduce a piece of media and/or media segment. However, media slices and/or segments may be distributed in accordance with any of a variety of method(s), algorithm(s) and/or policy(-ies).

When a user of a particular media device 101-106 desires to view a piece of media, the example media device 101-106 collects the distributed media slices needed to construct a piece of media and/or media segment from the two or more media devices 101-106 (one of which may be itself) that are storing the media slices. The media device 101-106 then aggregates the media slices together in a storage and/or buffer (e.g., a volatile storage 241) and displays the thus aggregated piece of media for the user. Whether or not a particular piece of media is protected via slicing and distribution may depend upon, for example, the type of media (e.g., TV show or movie), who owns the media (e.g., a studio or private individual), and/or copy protection rights associated with the piece of media, etc. For example, TV shows may not be protected via distributed media slices while movies are protected using any of the methods and systems disclosed herein. Example processes that may be carried out to collect and aggregated distributed media slices are discussed below in connection with FIGS. 10 and 11.

In the example system of FIG. 1, when a media device 101-106 collects distributed media slices, the example media device 101-106 does not retain the aggregated piece of media in non-volatile storage. Thus, if a piece of media is to be viewed again, the example media device 101-106 re-collects and re-aggregates the media slices. However, depending upon the security, privacy and/or theft policies and/or provisions implemented by the example system of FIG. 1 and/or the media device(s) 101-106, one or more of the media devices 101-106 may be allowed and/or enabled to store a collected piece of media (e.g., a movie) and/or certain types of media (e.g., TV shows) in non-volatile storage. In some examples, such non-volatile storage retention may be restricted and/or limited to some period of time such as, 24-hours for a collected movie to facilitate ease and/or flexibility of viewing by a user, or unlimited for collected TV shows. Additionally and/or alternatively, viewing and/or playback of the aggregated media stream may be restricted based on a media device identifier such that the aggregated media stream can not be ported to another media device 101-106.

In another example, the illustrated system of FIG. 1 facilitates the collection and/or aggregation of any of a variety of media segments to form any of a variety of super-programs. When a user of a media device 101-106 desires and/or makes a selection to watch a piece of media, the example media device 101-106 determines whether additional and/or alternative media segments can, should and/or may be inserted in the selected piece of media. For example, based on a profile of the user, the media device 1-01-106 may select one or more commercials (i.e., media segments) that the media device 101-106 will insert into commercial breaks. Alternatively, the media device 101-106 may present a list of additional and/or alternative media segments from which the user may select to be viewed instead of, in addition to, and/or inserted in between the nominal media segments that make up the selected piece of media. For example, the user may select to view an extra movie scene not included in a released version of a movie or may view an alternative ending. User profiles may include, among other things, any or all of an age, a sex, a marital status, an employment status, an address, an income, interests, hobbies, past pieces of media watched, web searches performed, etc. An example process that may be carried out to collect media segments and create super-programs is discussed below in connection with FIG. 12. An example data structure to store media segments is discussed below in connection with FIG. 16.

In yet another example, the illustrated system of FIG. 1 facilitates the selection and/or playback of super-programs including one or more media segment(s) that are sliced and distributed for protection. For example, the playback of a selected movie may include one or more previews and/or advertisements that are shown before the selected movie is displayed. In such an example, the movie itself may be sliced and distributed to prevent piracy of the movie, while the previews are media segments that may be acquired by a media device 101-106 in their entirety (i.e., not protected). The previews and/or advertisements shown before the movie may be determined by the media device 101-106 based upon a user profile and/or may be selected by the user from a list of, for example, available movie previews. Such a list may also include a list of advertisements such that if the user views a predetermined number of the advertisements, viewing of a selected movie is free. Example processes that may be carried out to collect and aggregate distributed media slices and/or collect media segments and create super-programs where media segments may be sliced and distributed are discussed below in connection with FIGS. 11 and 13.

In the example system of FIG. 1, super-programs are identified using any of a variety of method(s) and/or technique(s). For example, metadata for a piece of data may be parsed to identify the media segments that make up the piece of media. In one example, a search of a media directory and/or a universal directory based on metadata, program identifiers, segment identifiers, program title and/or program description can be performed to identify corresponding additional and/or alternative media segments. In another example, metadata is used to identify commercial and/or advertising media segments. Any of a variety of additional and/or alternative method(s), algorithm(s) and/or technique(s) may also be used to identify and/or extract commercials from a media stream such that one or more media segments can replace them.

To obtain pieces of media and/or media segments that may be sliced and distributed (i.e., stored or recorded), used to form super-programs, and/or collected and aggregated (i.e., played back), any of the example media devices 101-106 of FIG. 1 may be communicatively coupled to any of a variety of content providers 110 via any of a variety of content delivery protocol(s), network(s), system(s) and/or transmission path(s). For example, content delivery may occur via a satellite receiver and/or antenna 115, a cable and/or radio frequency (RF) input signal 120 received via any variety of cable TV signal(s) and/or terrestrial broadcast(s), and/or any variety of data communication network such as the Internet 125. Other additional and/or alternative delivery systems and/or methods include the DIRECTV® direct-to-home satellite delivery system, wireless distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. The example media devices 101-106 may connect to the Internet 125 via any of a variety of technology(-ies), system(s) and/or device(s). Moreover any combination and/or hybrid of these systems, networks and/or devices may be used to provide media to one or more of the example media devices 101-106. For example, low bandwidth media, such as audio, may be distributed in one manner and relatively high bandwidth media, such as audio and video, may be distributed via another manner.

In the example system of FIG. 1, pieces of media may be received from the content provider(s) 110 at any of a variety of data rates such as real-time (e.g., media received at substantially the same rate that it is displayed), sub real-time and/or trickle (e.g., media received at slower rate than it is or will be displayed), and/or high-speed (e.g., media received at higher rate than it is or will be displayed). Moreover, pieces of media may be associated with live and/or non-live programs and/or events.

To provide the pieces of media and/or media segments that may be protected, used to form super-programs, sliced, de-sliced and/or aggregated, the example system of FIG. 1 includes any variety and/or number of content provider(s) 110 such as, for example, television stations, satellite broadcasters, movie studios, advertisers, private individuals, corporations, advertisers, schools, organizations, etc. In the illustrated example of FIG. 1, the content provider(s) 110 deliver and/or otherwise provide the pieces of media to the example media device 101 via a satellite broadcast, such as the DIRECTV direct-to-home satellite broadcast using a satellite transmitter 130 and a satellite and/or satellite relay 135, a terrestrial and/or cable TV broadcast 120 and/or the Internet 125. As illustrated in FIG. 1, the content provider(s) 110 may also deliver and/or otherwise provide media to any of the other example media devices 102-106. However, as illustrated, all of the media devices 101-106 need not be associated with and/or receive media from a content provider 110.

While not shown in FIG. 1, the example content provider(s) 110 may also implement and/or otherwise operate one or more media devices that may participate with the example media devices 101-106 in the distributed protection of media and/or the aggregation of media segments to form super-programs. For example, an advertiser 110 may implement a media device that provides and/or otherwise makes available to the media devices 101-106 targeted advertisement media segments that may be, for example, selected and/or inserted by the media devices 101-106 in between media segments of a TV show. In one example, the advertiser 110 operates an advertisement selection server (not shown) with which the example media devices 101-106 can interact via, for example, the Internet 125 to select and/or determine one or more targeted advertisement media segments for a particular user. The media devices 101-106 may exchange user profile information with the advertisement selection server, and/or the advertisement selection server may store user profiles such that the media devices 101-106 need only uniquely identify a user to the advertisement selection server to obtain targeted advertisement media segments.

To facilitate the distributed storage and retrieval of media segments and/or media slices, the example media devices 101-106 are communicatively coupled via any of a variety of communication network(s), protocol(s), device(s) and/or system(s) such as a wired and/or wireless LAN 140 implemented within, for example, a residence, apartment building, office or office building 145, and/or or the Internet 125. As such, the media devices 101-106 may be associated with any of a variety user(s), media delivery subscriber(s) and/or geographic location(s).

Because in some examples media slices and/or media segments are distributed within the example system of FIG. 1, the system of FIG. 1 may include any number of redundant and/or backup media devices associated with any of the example media devices 101-106, three of which are illustrated in FIG. 1 with reference numerals 101A, 104A and 105A. In the illustrated example of FIG. 1, the redundant media devices 101A, 104A and 105A mirror and/or duplicatively store and/or retain the media segments and/or media slices stored and/or retained by their associated media device, that is, the example media devices 101, 104 and 105, respectively.

Using any of a variety of protocol(s), method(s) and/or technique(s) such as a "still alive" message, the example redundant media devices 101A, 104A and 105A monitor the state of their respective and/or associated media device, and if their associated media device, for example, fails, shuts down, experiences a power failure, loses communicative coupling to the other media devices 101-106, or has an error, the example redundant media device 101A, 104A or 105A replace their associated media device with respect to the other media devices 101-106. When and/or if, for example, a failed media device 101, 104 or 105 is repaired or regains power, the associated redundant media device can re-establish the state of the media device 101, 104 or 105 such that the media device 101, 104 of 105 can resume distributed communications with the other media devices 101-106. While in the example of FIG. 1, the redundant media devices 101A, 104A and 105A are shown together with their associated media device 101, 104 and 105, the redundant media devices 101A, 104A and 105A need not be geographically co-located with their respective media device.

For any particular piece of media, each of the example media devices 101-106 of FIG. 1 has at least one of the following roles: (a) a "master: indicating that the media device 101-106 received the piece of media from a content provider, (b) a "storer" indicating that the media device 101-106 is storing at least one media segment and/or media slice associated with the piece of media, (c) a "client" indicating that a user of the media device 101-106 wants to view and/or playback a portion of the piece of media and/or a superprogram created from and/or with the piece of media or (d) "uninvolved" indicating that the media device 101-106 is neither a master, a storer nor a client. A media device 101-106 can be a master, a storer and/or a client for a particular piece of media. Moreover, there may be more than one master for any particular piece of media because more than one media device 101-106 may receive, store and/or distribute the piece of media. However, as discussed below in connection with FIG. 7, the example media devices 101-106 of FIG. 1 cooperate to reduce the duplicative storage of media slices and/or media segments. In the example of FIG. 1, a piece of media protected via slicing and distribution will have at least two associated storer media devices 101-106.

To track and/or record the availability of pieces of media, media segments and/or media slices, each of the example media devices 101-106 of FIG. 1 utilize, track and/or maintain a directory that includes: (a) a media directory of pieces of media received and recorded and/or stored by the media device 101-106 (i.e., pieces of media for which the media device 101-106 is a master) and (b) a universal directory of pieces of media received and recorded and/or stored by other media devices 101-106. When a media device 101-106 records and/or stores a piece of media, the media device 101-106 notifies the other media devices 101-106 so that they can update their universal directory. The example media devices 101-106 use their directory (i.e., their media directory and their compiled universal directory) to present possible media selections to their associated user(s). An example process that may be carried out to share directory information and/or compile a universal directory is discussed below in connection with FIG. 7. Example data structures to store a media directory and a universal directory are discussed below in connection with FIGS. 14 and 17, respectively.

Additionally or alternatively, a universal directory need not be maintained at any of the media devices 101-106. Instead, when a user desires to view, select and/or playback a piece of media, a media device 101-106 can request media directory information from the other media devices 101-106. Alternatively, there could be a central directory that is queried when directory information is needed.

To facilitate updates of their universal directories, media slice distribution, media slice and/or media segment collection, each of the example media devices 101-106 of FIG. 1 maintain a list of media devices to which they are currently communicatively coupled and/or able to share directory information, media slices and/or media segments (i.e., a device list). An example process that may be carried out to collect information about other media devices 101-106 is discussed below in connection with FIG. 6. An example device list data structure is discussed below in connection with FIG. 18.

To facilitate the exchange, transmission and/or reception of directory information and/or information regarding other media devices 101-106, the example media devices 101-106 utilize, send and/or receive any of a variety of messages. Example messages are discussed below in connection with FIGS. 19 and 20.

Figure 2:
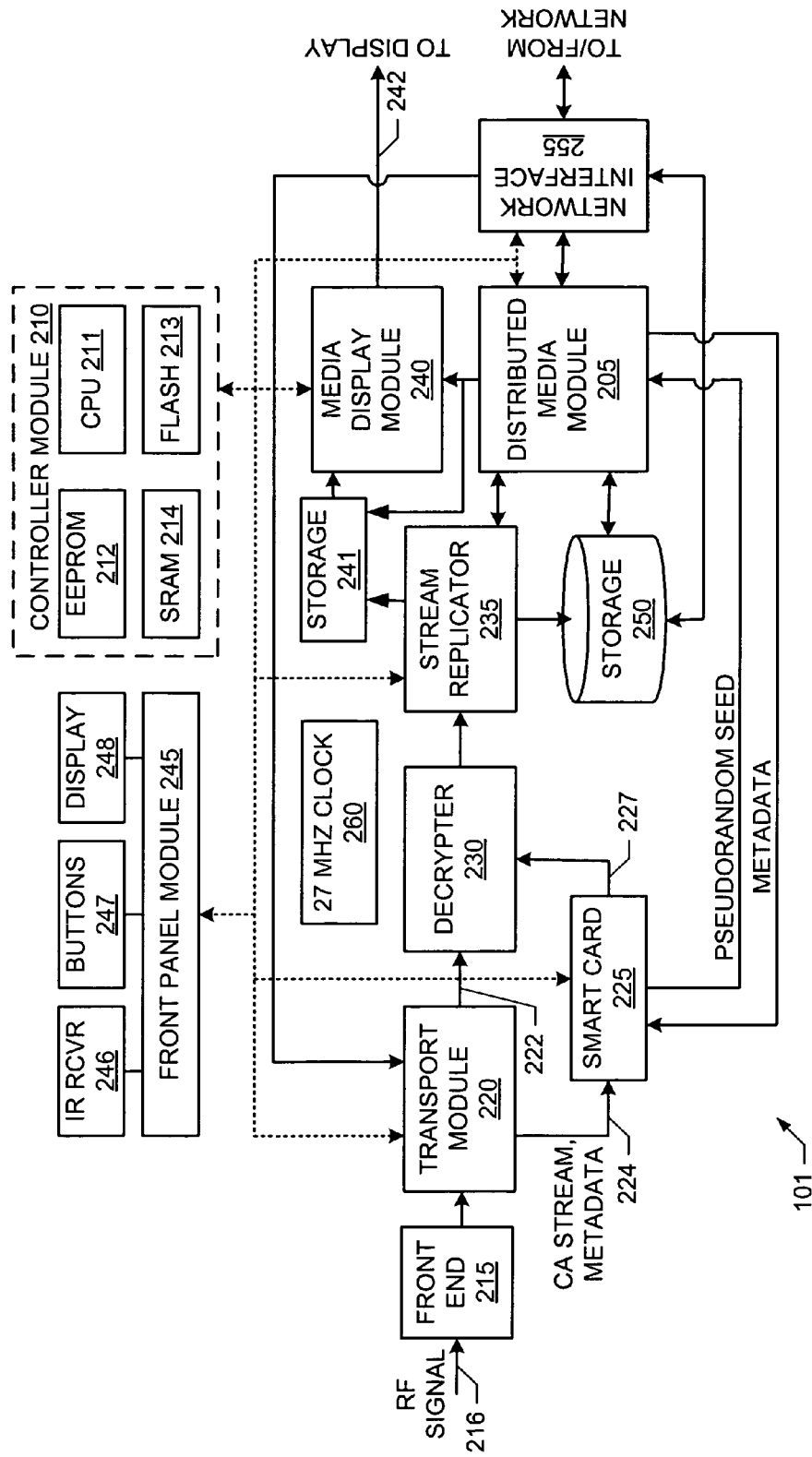
FIGS. 2 and 3 illustrate example manners of implementing any of the example media devices of FIG. 1.

FIG. 2 is an example manner of implementing any of the example media devices 101-106, 101A, 104A and 105A of FIG. 1. However, for ease of discussion, the example device of FIG. 2 will be referred to a media device 101. In general, circuitry, modules and/or components inside the media device 101 receive information from one or more sources. Decoding circuitry, modules and/or components receive the media stream and perform video/audio processing operations such as decryption, de-multiplexing and/or decompression (i.e., decoding). Optionally, distributed media circuitry, module and/or components 205 can slice and/or identify one or more portions of a received media stream into media slices and distribute the media slices amongst two or more media devices 102-106 and, possibly, the media device 101, and/or form a media stream by collecting and aggregating distributed media slices, and/or collecting and aggregating media segments. One or more processor(s), microprocessor(s) or central processing unit(s) (CPU) 211 of a controller module 210 controls the overall operation of the example media device 101, including the selection of parameters, the set-up and control of components, channel selection, and many other functions of the example media device 101 of FIG. 2.

In one example, L-band RF signals from a satellite/relay (e.g., the example satellite/relay 135 of FIG. 1) via a low-noise block (LNB) that amplifies and frequency downconverts the received signals (not shown) and/or a RF input signal received via any variety of cable TV signal(s) and/or terrestrial broadcast(s), and convert the signals back into a digital media bitstream (i.e., a media stream). Additionally or alternatively, the media device 101 can also receive a media stream via the Internet 125.

More specifically, the example media device 101 of FIG. 2 includes the distributed media module 205, the controller module 210, any of a variety of front end modules 215, any of a variety of transport modules 220, any of a variety of security devices such as a smart card 225, any of a variety of decrypters 230, any of a variety of stream replicators 235, any of a variety of display modules 240, any of a variety of front panel modules 245, a power supply (not shown), any of a variety of storage and/or storage devices 250, and any of a variety of network interfaces 255. As further shown in FIG. 2, a 27 megahertz (MHz) clock signal generator 260 is also provided. The clock generator 260 generates a clock signal that is coupled to various components of the example media device 101 and may be frequency-calibrated by a signal received from the front end 215.

The example front end module 215 and the example transport module 220 of FIG. 2 are controlled by the controller module 210 and may be implemented using any of a variety of technique(s), device(s), circuit(s) and/or component(s). In general, the front end module 215 is compatible with the modulation scheme utilized for an incoming RF signal 216, and the transport module 220 is compatible with the distribution, framing, packetization, protocol(s) and/or data structure(s) employed by a content provider 110 to distribute a media stream 222 via the RF signal 216. An example front end module 215 and example transport module 220 are implemented in accordance with the DIRECTV direct-to-home system. More specifically, the front end module 215 implements, among other things, a tuner and a demodulator, and the transport module 220 implements, among other things, a de-framer, a de-packetizer and/or an FEC decoder. As illustrated in FIG. 2, the example transport module 220 also extracts a conditional access (CA) stream (if there is one present) and/or the metadata 224 for each piece of media.

Another example front end module 215 receives an analog or digital cable television broadcast signal 210 via a splitter (not shown) that is coupled to an antenna or a cable/terrestrial broadcast system and implements an Advanced Television Systems Committee (ATSC)/National Television System Committee (NTSC) tuner, an NTSC decoder and a vestigial side band (VSB) demodulator to convert received information into a digital bitstream that can be converted by the transport module 220 into the media stream 222 based on the protocol(s), data structure(s), framing and/or packetization implemented by the content provider 110. As illustrated in FIG. 2, the transport module 220 may, additionally or alternatively, receive a video signal via the network interface 255. For example, the transport module 220 may receive an IPTV based signal and remove IP packetization to form the media stream 222.

If the media stream 222 was encrypted by the content provider 110, the media device 1 01 of FIG. 2 may optionally decrypt the encrypted media stream 222. To decrypt an encrypted media stream 222, the example media device 101 of FIG. 2 includes any of a variety of security devices such as the smart card 225 and any of a variety of decypters 230. Using any of a variety of method(s), algorithm(s) and/or technique(s) such as a cryptographic hash, the example smart card 225 of FIG. 2 extracts one or more decryption secrets and/or keys 227 from the CA stream 224 and provides the secrets and/or keys 227 to the decrypter 230. The example smart card 225 of FIG. 2 is accessed via a smart card reader (not shown) associated with the example front panel module 245.

Using any of a variety of method(s), algorithm(s) and/or technique(s), the example decrypter 230 of FIG. 2 decrypts the encrypted media stream 222 using the decryption secrets and/or keys 227 determined by the smart card 225. If the media stream 222 is not encrypted and/or if the media stream 222 is to be left encrypted, the example decrypter 230 of FIG. 2 can be bypassed and/or disabled.

To support simultaneous demands on an incoming media stream 222 (e.g., viewing simultaneous with storage and/or slicing and distribution), the example media device 101 of FIG. 2 includes any of a variety of stream replicators 235. The example stream replicator 235 is able to queue, buffer and/or distribute one or more incoming media streams 222 and/or media segments of a media stream 222 (e.g., as determined by metadata associated with the media stream 222) to and/or amongst two or more destinations such as the media display module 240, the storage 250 and the distributed media module 205. In the example of FIG. 2, the two or more destinations may receive time shifted versions of the media stream 222 to support, for example, trick playing. In the example of FIG. 2, media segments of an incoming media stream 222 that are not to be sliced and/or distributed can be stored directly onto the storage 250. As illustrated in FIG. 2, the stream replicator 235 can also queue, buffer and/or distribute a media stream created by the example distributed media module 205.

An example manner of implementing the example distributed media module 205 of FIG. 2 is discussed below in connection with FIG. 4. In one example, the distributed media module 205 of FIG. 2 receives a stream of encoded audio/video (A/V) data (i.e., a media stream) from the stream replicator 235, slices the media stream to form media slices, and distributes the media slices amongst two or more media devices 101-106 via the network interface 255. In the example system of FIG. 2, media slices are distributed amongst the media devices 101-106 in a substantially random fashion to thwart attempts to steal pieces of media. However, media slices may be distributed in accordance with any of a variety of method(s), algorithm(s) and/or policy(-ies). In the example system of FIG. 1, one of the two or more media devices 101-106 may be the media device 101 doing the splitting and distributing. The example distributed media module 205 can also collect and aggregate media slices from two or more media devices 101-106 (including itself) to re-constitute a media stream, a piece of media and/or a media segment that is then displayed via the example media display module 240.

In another example, the example distributed media module 205 of FIG. 2 is able to determine, select and/or cause a user to be prompted to select a piece of media and/or one or more media segments, the distributed media module 205 then collects (possibly from one or more media devices 101-106) and aggregates the selected media segments to form a media stream (e.g., a super-program) that is then displayed via the example media display module 240.

In yet another example, one or more media segments of a super-program contain media slices that are distributed amongst two or more media devices 101-106. Thus, in addition to collecting and aggregated non-sliced media segments, the example distributed media module 205 of FIG. 2 is able to collect and aggregate one or more media slices that make up one or more of the media segments of a super-program.

To facilitate playback of pieces of media, media segments, media slices, super-programs and/or the media stream 222, the example media device 101 of FIG. 2 includes any of a variety of media display modules 240. An example display module 240 of FIG. 2 receives a media stream of encoded A/V data (i.e., a media stream) from the example stream replicator 235 via volatile storage 241 (e.g., one or more dynamic random access memories (DRAMs)) that stores and/or buffers the media stream prior to playback, and any of a variety of decoders to decode the received encoded A/V data, as needed. While the example storage 241 is shown separate from the stream replicator 235, the media display module 240 and/or the example distributed media module 205, any of the storage 241 may be implemented by and/or within any of the stream replicator 235, the media display module 240 and/or the example distributed media module 205.

An example video decoder reads the encoded video data from the storage 241, parses it, obtains quantized frequency domain coefficients, and then performs an inverse quantization, an inverse discrete cosine transform (DCT) and motion compensation. At this point, an image is reconstructed in the spatial domain and stored in a frame buffer (not shown). At a later time, the image is read out of the frame buffer and passed to any of a variety of encoder (not shown). An example video encoder converts the digital video signals to, for example, an analog signal according to the NTSC standard or to another desired output protocol (e.g., a protocol defined by the ATSC), thereby allowing video to be received by a display device via an A/V output signal 242. Alternatively or additionally, the display module 240 may generate graphics that allow, for example, an electronic program guide to be displayed.

To receive inputs and provide outputs, the illustrated example media device 101 of FIG. 2 includes any of a variety of front panel modules 245 that provide an interface between the example controller module 210 and a plurality of input and/or output devices (e.g., devices 246, 247 and 248). To receive user inputs and/or selections from a remote control, the media device 101 includes an infrared (IR) receiver 246. In addition, support for a RF remote control, e.g. that uses UHF frequencies instead of IR frequencies, may be offered through a RF receiver module (not shown). A user may also provide inputs and/or control the example media device 101 via one or more buttons (e.g., power on/off, play, etc.) 247 physically located on the media device 101. To provide user prompts, status, date, time, etc. information to a user, the illustrated example includes any of a variety of display devices 248, such as a liquid crystal display (LCD).

The example controller module 210 of FIG. 2 may be implemented using any of a variety of techniques, devices, components and/or circuits. An example controller module 210 includes one of any variety of microprocessors, processors, controllers, CPUs 211, an electronically erasable programmable read only memory (EEPROM) 212 and/or flash memory 213 to store, for example, machine accessible instructions that may be executed by the CPU 211, and a static random access memory (SRAM) 214 to store data and/or variables used and/or accessed by the CPU 211.

The example storage 250 of FIG. 2 may be implemented by any variety of volatile and/or non-volatile data and/or media store(s) and/or device(s) such as, for example, any of a combination of hard disk drive(s) (HDD), VCR cassette(s), DVD(s), compact disc(s) (CD), flash memory and/or RAM devices. The example storage 250 may be used to store, among other things, media streams, pieces of media, media slices, media segments and/or any of the media device's directory. In the example of FIG. 2, the storage 250 is used to store the media device's media directory (i.e., the list of media stored and/or recorded by the media device 101.

To communicatively couple the media device 101 to any other media devices 102-106 via a LAN (e.g., the example LAN 140 of FIG. 1) and/or the Internet 125, the example media device 101 of FIG. 2 includes any of a variety of network interfaces 255. The example network interface 255 of FIG. 2 implements any of a variety of wired and/or wireless Ethernet interfaces in accordance with any of a variety of current and/or future Ethernet standards such as the Institute of Electronics and Electrical Engineers (IEEE) 802.11x or 802.3x standards. Additionally or alternatively, the network interface 255 implements any of a universal serial bus (USB) interface, an IEEE 1394 (a.k.a. firewire) interface, a serial and/or parallel interface, a voice-band and/or integrated services digital network (ISDN) modem connected to a conventional public switched telephone network (PSTN), a broadband wired connection (e.g., via an asymmetric digital subscriber line (ADSL) modem or cable modem), and/or a leased transmission facility (e.g., a digital signal level 1 circuit (a.k.a. a DS1), a fractional-DS1, etc.).

Figure 3:
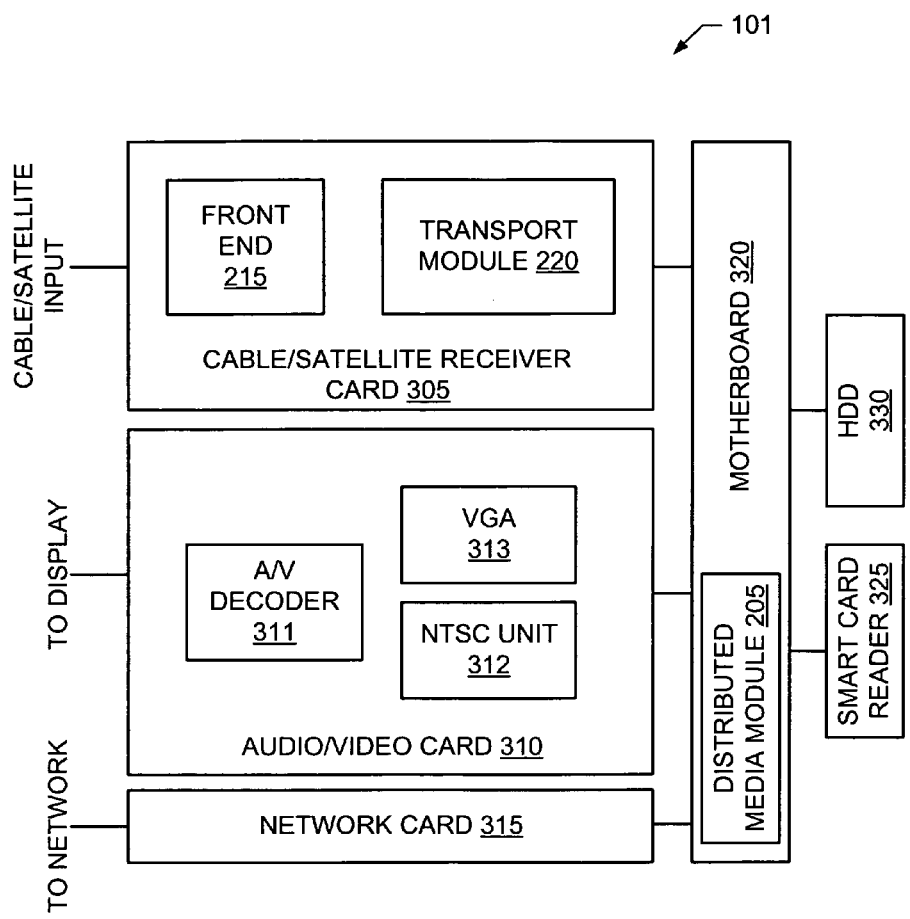

FIG. 3 illustrates an alternative implementation of the example media device 101 of FIG. 2. The example media device 101 of FIG. 3 has a PC-based architecture. As shown, the example media device 101 of FIG. 3, which receives an input from an LNB, includes any variety of cable and/or satellite receiver card 305, any of a variety of audio/video cards 310 and any of a variety of network cards 315, each of which may be coupled to a motherboard 320. The video/audio decoder card 310 could, of course, be integrated with the receiver card 305 or the motherboard 320, and/or the network card 315 may be integrated into the motherboard 320. The example media device 101 of FIG. 2 also includes any of a variety of smart card reader(s) 325 and any of a variety of HDD(s) 330 that may be coupled to the motherboard 320 and/or integrated with the example cards 305, 310 and/or 315.

The example cable and/or satellite receiver card 305 of FIG. 3 includes a front end (e.g., the example front end 215 of FIG. 2) and a transport module (e.g., the example transport module 220). The implementation and/or interconnection of these devices are substantially the same as shown and described in conjunction with FIG. 2 and, thus, are not discussed here. Instead, identical elements are illustrated with identical reference numerals in FIGS. 2 and 3, and the interested reader is referred back to the descriptions presented above in connection with FIG. 2.

The example audio/video decoder card 310 of FIG. 3 includes any of a variety of audio/video decoders 311, any of a variety of optional NTSC and/or ATSC output drivers 312 and any of a variety of video graphics adapter (VGA) output drivers 313. As described below in detail, the example receiver card 305 can receive satellite signal received via the LNB and/or a broadcast TV signal, and the example audio/video card 310 can decode a received signal provided by the receiver card 305.

In one configuration, the transport module 220 passes audio/video data to the decoder 311 of the example video/audio decoder card 310. Additionally or alternatively, the data may be stored in system RAM (not shown) for buffering, and the video/audio decoder 311 retrieves the data from RAM as needed. For video data, the audio/video decoder 311 reads in the encoded video data from its RAM, and, using any of a variety of technique(s) and/or method(s), decodes the encoded video data and stores the resulting video data in a frame buffer in the video decoder's RAM. At a later time, the image may be read out of the frame buffer and passed through the display circuitry to the VGA output driver 313 and/or optionally, to the NTSC and/or ATSC output driver 312, the output of which may be coupled to a display device. The display circuitry may also generate graphics and text for a graphical user interface (GUI), such as an electronic program guide, to be displayed.

In the example of FIG. 3, the network card 315 implements the example network interface 255 of FIG. 2. Likewise, the example HDD 330 of FIG. 3 implements the example storage 250 of FIG. 2.

In the example of FIG. 3, the example distributed media module 205 of FIG. 2 is implemented as machine readable instructions executed by one or more processors (not shown) associated with the motherboard 320. The distributed media module 205 of FIG. 3 may also be implemented as any combination of hardware, software, and/or firmware on the motherboard 320 and/or elsewhere in the example media device 101 of FIG. 3.

Although not shown, any one or more of the example cards 305, 310, 315 and/or 320 may include one or more processors to execute machine readable instructions that may be used to implement the example methods, processes, apparatus, and/or systems described herein. Also, the allocation of memory and control functions may be divided between the cards 305, 310, 315 and/or 320 of the example media device 101 of FIG. 3. Thus, a substantial amount, or possibly all, of the control and memory functions for operation of the disclosed system may be integrated within a single card, or alternatively, may be incorporated within and/or into the PC motherboard 320.

While example media devices 101 have been illustrated in FIGS. 2 and 3, the elements, modules, logic, sub-systems and/or devices illustrated in FIGS. 2 and/or 3 may be combined, re-arranged, eliminated and/or implemented in any of a variety of ways. Further, the example transport module 220, the example decrypter 230, the example stream replicator 235, the example display module 240, the example distributed media module 205 and/or the example media devices 101 of FIGS. 2 and/or 3 may be implemented by hardware, software, firmware and/or any combination of hardware, software and/or firmware. Moreover, the example media devices 101 may include additional elements, modules, logic, subsystems and/or devices than those illustrated in FIGS. 2 and/or 3 and/or may include more than one of any or all of the illustrated elements, modules, sub-systems and/or devices.

Figure 4:
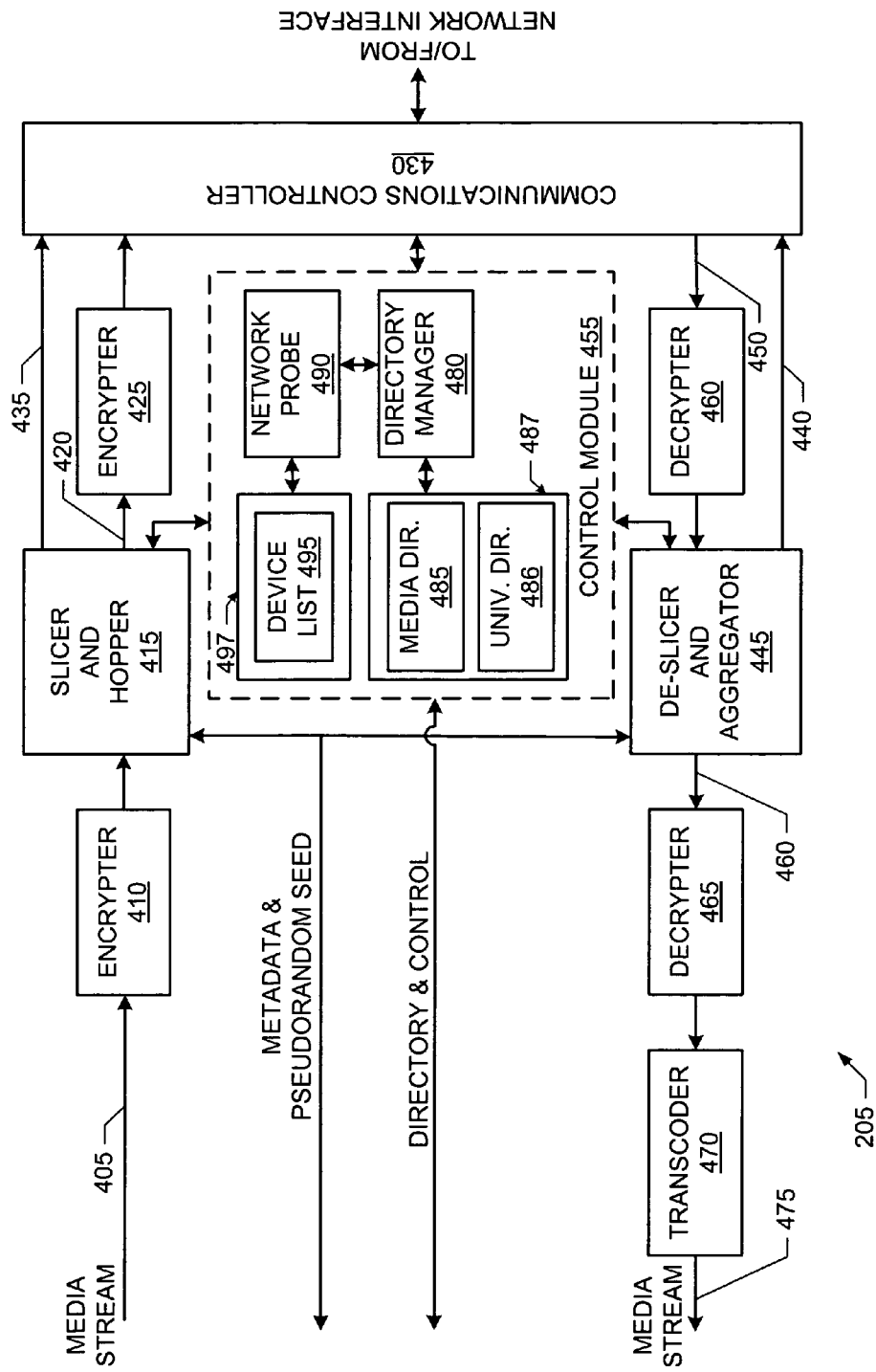
FIG. 4 illustrates an example manner of implementing the example distributed media module of FIGS. 2 and/or 3.

FIG. 4 illustrates an example manner of implementing the example distributed media module 205 of FIGS. 2 and/or 3. For simplicity of understanding, the following discussions will be made with respect to a particular media device (e.g., the example media device 101 of FIGS. 1, 2 and/or 3). Accordingly, other media devices to which the example media device 101 may be communicatively coupled are subsequently referred to as the media devices 102-106 (i.e., other media devices 102-106). Persons of ordinary skill in the art will readily appreciate that the methods and apparatus discussed below in connection with the example distributed media module 205 and/or more generally the example media device 101 of FIGS. 1, 2 and/or 3 may be similarly applied to and/or implemented by the other example media devices 102-106, 101A, 104A and/or 105A. For example, the other media devices 102-106, 101A, 104A and/or 105A may implement substantially similar distributed media modules 205.

To optionally encrypt an incoming media stream 405, the example distributed media module 205 of FIG. 4 includes any variety of encrypter 410. Using any of a variety of method(s), algorithm(s) and/or technique(s), the example encrypter 410 of FIG. 4 encrypts the incoming media stream 405. In the example of FIG. 4, the encrypter 410 can be bypassed and/or disabled on per media stream basis and/or as configured by a content service provider 110. An encryption secret and/or key used by the example encrypter 410 is selected, determined and/or chosen such that media devices 101-106 authorized to playback the media stream and/or piece of media are able to select, determine and/or chose a corresponding decryption secret and/or key such that authorized media devices 101-106 can decrypt a subsequently collected and/or aggregated media stream.

Methods and systems to select, determine, share and/or manage content playback authorization, and/or encryption secrets and/or encryption keys amongst media devices, content delivery networks and/or content providers are described in U.S. patent application Ser. No. 11/434,404 entitled "Secure Content Transfer Systems and Methods to Operate the Same" and filed on May 15, 2006; Ser. No. 11/434,437 entitled "Methods and Apparatus to Conditionally Authorize Content Delivery at Receivers in Pay Delivery Systems" and filed on May 15, 2006; Ser. No. 11/433,969 entitled "Methods and Apparatus to Provide Content on Demand in Content Broadcast Systems" and filed on May 15, 2006; Ser. No. 11/433,926 entitled "Methods and Apparatus to Protect Content in Home Networks" and filed on May 15, 2006; Ser. No. 11/434,538 entitled "Methods and Apparatus to Conditionally Authorize Content Delivery at Content Servers in Pay Delivery Systems" and filed on May 15, 2006; Ser. No. 11/434,528 entitled "Methods and Apparatus to Conditionally Authorize Content Delivery at Broadcast Headends in Pay Delivery Systems" and filed on May 15, 2006; and Ser. No. 11/434,082 entitled "Content Delivery Systems and Methods to Operate the Same" and filed on May 15, 2006. All of the above identified patent applications are hereby incorporated by reference in their entirety.

To slice and distribute the media stream 405 (possibly after optional encryption by the encrypter 410), the example distributed media module 205 of FIG. 4 includes a slicer and hopper 415. An example manner of implementing the example slicer and hopper 415 of FIG. 4 is discussed below in connection with FIGS. 8 and 9. In one example, the example slicer and hopper 415 of FIG. 4 segments, slices and/or splits the media stream 405 into one or more media slices 420. The example slicer and hopper 415 can slice the media stream 405 into media slices 420 having any of a variety of sizes as configured by a content service provider 110 and/or as chosen by an implementer and/or provider of the example system of FIG. 1 and/or the example distributed media module 205 of FIG. 4. The number of media slices 420 used to represent any particular piece of media depends upon the length and/or size of the media stream 204 associated with the piece of media and the size of the media slices 420.

In another example, the example slicer and hopper 415 of FIG. 4 segments the media stream 405 into the media segments 420 as specified by the metadata for the media stream. In the examples of FIGS. 1, 2, 3 and/or 4, media segments 420 can be stored locally (e.g., on the example storage 250 of FIG. 2), can be sent for storage on other media devices 102-106, and/or can be sliced into media slices 420 and distributed by the example slicer and hopper 415 amongst two or more media devices 101-106.

The example slicer and hopper 415 of FIG. 4 determines to which of the media devices 101-106 (including possibly itself) media slices and/or segments 420 should be distributed based upon a pseudorandom seed and the title and/or program name of the media stream. In the example system of FIG. 1, an encrypted version of the pseudorandom seed is contained in the metadata for the media stream.

The example slicer and hopper 415 of FIG. 4 may optionally apply forward error correction (FEC) to any or all of the media slices and/or segments 420 to facilitate subsequent recreation of missing and/or corrupted media slices and/or segments 420.

An example slicer and hopper 415 of FIG. 4 causes dummy and/or blank media slices and/or segments 420 to be sent and/or distributed to media devices 101-106 for purposes of deception and/or obscuration thereby providing additional protection against content theft and/or piracy. Likewise, the slicer and hopper 415 may cause the media slices and/or segments 420 to be sent to the media devices 101-106 out of order. For example, the slicer and hopper 415 may reorder the media slices and/or segments 420 before providing them to the communications controller 430, or the slicer and hopper 415 may specify to the communications controller 430 the order in which to send the media slices and/or segments 420.

To optionally encrypt the media slices and/or segments 420, the example distributed media module 205 of FIG. 4 includes any variety of encrypter 425. Using any of a variety of method(s), algorithm(s) and/or technique(s), the example encrypter 425 of FIG. 4 encrypts the individual media slices and/or segments 420. Like the encrypter 410, the encrypter 425 can be bypassed and/or disabled, and an encryption secret and/or key used by the example encrypter 425 is selected, determined and/or chosen such that media devices 101-106 authorized to playback the media stream and/or piece of media are able to select, determine and/or chose the an associated decryption secret and/or key such that authorized media devices 101-106 can decrypt collected media segments and/or slices 420.

To send media segments and/or media slices to other media devices 102-106, the example distributed media module 205 of FIG. 4 includes the communications controller 430. For each, possibly encrypted, media slice and/or segment 420, the example communications controller 430 receives a destination 435 such as an IP address from the example slicer and hopper 415. Using any of a variety of protocol(s), data structure(s), packet(s), frame(s) and/or message(s), the example communications controller 430 of FIG. 4 sends the media slices and/or segments 420 to their respective destinations. If a particular media slice and/or segment 420 is to be stored locally on the media device 101, the slicer and hopper 415 stores the media slice and/or segment 420 on the storage 250 (FIG. 2). Additionally or alternatively, all media slices and/or segments 420 are provided to a communications controller 430, and the communications controller 430 sends media slices and/or segments 420 to be locally stored to the storage 250.

The example communications controller 430 also implements any of a variety of transmit and/or receive buffers, and/or flow-control as necessitated by a data rate associated with the media stream and/or a communication bandwidth and/or data rate associated with a communication network to which the communications controller 430 is coupled. An example communications controller 430 buffers the media slices and/or segments 420 and sends the media slices and/or segments 420 in a substantially random order relative to the order in which the media slices and/or segments 420 were received at the communications controller 430.

Based upon source addresses 440 provided by a de-slicer and aggregator 445, the example communications controller 430 of FIG. 4 uses any of a variety of protocol(s), data structure(s), packet(s), frame(s) and/or message(s) to receive and/or otherwise obtain media slices and/or media segments 450 from the media devices 101-106 and/or a local storage 250 (FIG. 2). An example communications controller 430 receives and/or obtains the media slices and/or segments 450 in a substantially random order relative to the order in which the media slices and/or segments 450 were requested by and/or are provided to the de-slicer and aggregator 445.

The example communications controller 430 of FIG. 4 also transmits and/or receives network probe and/or universal directory messages for a control module 455.

To decrypt received media slices and/or segments 450 that were optionally encrypted by a master media device 101-106, the example distributed media module 205 of FIG. 4 includes any variety of decrypter 460. Using any of a variety of method(s), algorithm(s) and/or technique(s), the example decrypter 460 of FIG. 4 decrypts individually encrypted media slices and/or segments 450.

To collect and aggregate media slices and/or media segments 450, the example distributed media module 205 of FIG. 4 includes the de-slicer and aggregator 445. In one example, the example de-slicer and aggregator 445 of FIG. 4 collects two or more media slices 450 from two or more media devices 101-106 (including possibly itself) via the communications controller 430, and aggregates the two or more media slices 450 together to form a media stream 460. In another example, the example de-slicer and aggregator 445 of FIG. 4 collects two or more media segments 450 from one or more media devices 101-106 (including possibly itself), and aggregates them together to form the media stream 460. In yet another example, at least one of the two or more media segments 450 is obtained by collecting and aggregating two or more media slices 450. The example de-slicer and aggregator 445 of FIG. 4 as rapidly as possible (e.g., at a rate greater than real-time) obtains and aggregates the media slices and/or segments 450 until one or more receive volatile-storage media stream buffers (e.g., the example storage 241 of FIG. 2) are full. The example de-slicer and aggregator 445 then continues obtaining the media slices and/or segments 450 to refill the media stream buffers as they are depleted during playback. Example manners of implementing the example de-slicer and aggregator 445 are discussed below in connection with FIGS. 9-13.

The example de-slicer and aggregator 445 of FIG. 4 determines from which of the media devices 101-106 (including possibly itself) media slices and/or segments 450 should be obtained based upon a pseudorandom seed and the title and/or program name of the media stream. In the examples of FIGS. 1, 2, 3 and/or 4, an encrypted version of the pseudorandom seed is contained in the metadata for the media stream. If a particular media slice and/or segment 450 is stored locally on the media device 101-106, the de-slicer and aggregator 445 can obtain the media slice and/or segment 450 directly from the storage 250 (FIG. 2). Additionally or alternatively, all media slices and/or segments 450 are obtained via the communications controller 430, and the communications controller 430 obtains locally available media slices and/or segments 450 from the storage 250. The example de-slicer and aggregator 445 of FIG. 4 directs the communications controller 430 to collect media slices and/or media segments 450 by providing one or more source address 440 to the communications controller 430.

The example de-slicer and aggregator 445 of FIG. 4 may optionally apply FEC decoding to any or all of the media slices and/or segments 450 to recreate and/or correct missing and/or corrupted media slices and/or segments 450 and/or missing and/or disabled media devices 101-106.

An example de-slicer and aggregator 445 of FIG. 4 causes dummy and/or blank media slices and/or segments 450 to be obtained from the media devices 102-106 for purposes of deception and/or obscuration thereby providing additional protection against content theft and/or piracy. Likewise, the de-slicer and aggregator 445 may cause the media slices and/or segments 450 to be obtained by the communications controller 430 out of order.

To decrypt the aggregated media stream 460 that was optionally encrypted by a master media device 101-106, the example distributed media module 205 of FIG. 4 includes any variety of decrypter 465. Using any of a variety of method(s), algorithm(s) and/or technique(s), the example decrypter 465 of FIG. 4 decrypts the media stream 460. Because media segments 450 may have been separated encrypted, the example decrypter 465 of FIG. 4 may decrypt individual media segments 450 rather than operating on the media stream 450 as a whole.

The decrypters 460 and 465 and/or, more generally, a media device 101-106 to which the decrypters 460 and 465 belong obtain the encryption secret(s) and/or encryption key(s) necessary to decrypt the media slices and/or segment 450 and/or the media stream 460 using any of a variety of method(s), protocol(s) and/or technique(s). In the example system of FIG. 1, whether the requisite encryption secret(s) and/or key(s) for a particular piece of media, media segment and/or media slice 450 are obtainable by a particular media device 101-106 depends upon whether the media device 101-106 is authorized to obtain, aggregate and/or playback the piece of media, media segment and/or media slice.

To transcode one or more portions of the media stream 460, the example distributed media module 205 of FIG. 4 includes any of a variety of transcoders 470. Using any of a variety of method(s), algorithm(s) and/or technique(s), the example transcoder 470 decodes and re-encodes (i.e., transcodes) and/or adjust timestamps associated with one or more portions of the media stream 460 to form an output media stream 475. In particular, because the media segments 450 of a piece of media and/or super-program may be obtained from different media devices 101-106 and/or may have been recorded by different media devices 101-106, the media segments 450 may have differing encoding parameters, data rates and/or picture quality. Accordingly, the example transcoder 470 of FIG. 4 transcodes one or more media segments 450 such that all media segments 450 of a particular piece of media have, for example, common encoding parameters, a common data rate, picture size and/or picture quality. Additionally, if two media segments 450 being placed adjacent in the media stream 475 would result in a discontinuity in the media stream's timestamps, the example transcoder 470 adjusts the media stream's timestamps to provide smooth playback of the media stream 475.

To control the operation of the example distributed media module 205 of FIG. 4, the distributed media module 205 includes the control module 455. The example control module 455 of FIG. 4 is responsible for overall management of the example distributed media module 205 and provides directory information and/or listings of available pieces of media that may be presented to a user. As discussed below, the directory information includes metadata for the available pieces of media to facilitate the obtainment of pseudorandom seeds. Example manners of implementing the example control module 455 of FIG. 4 are discussed below in connection with FIGS. 5-7.

To maintain a media directory 485 (e.g., for pieces of media and/or media segments for which the media device 101 of FIGS. 2 and/or 3 is a master) and a universal directory 486 (e.g., for pieces of media and/or media segments recorded by other media devices 102-106), the example control module 455 of FIG. 4 includes a directory manager 480. The example directory manager 480 of FIG. 4 transmits, receives and/or exchanges directory information, directory updates and/or directory related messages with other media devices 102-106 via the example communications controller 430. Based upon metadata for media received with pieces of media at the media device 101, the example directory manager 480 maintains its media directory 485 and sends media directory change information to other media devices 102-106 to which the media device 101 is communicatively coupled. Based upon directory information received from the other media devices 102-106, the example directory manager 480 of FIG. 4 maintains and/or updates its universal directory 486. An example manner of implementing the example directory manager 480 is discussed below in connection with FIGS. 5 and 7. Example messages that may be used to transmit, send and/or exchange directory information are discussed below in connection with FIGS. 19 and 20.

The example directory manager 480 of FIG. 4 provides information from the media directory 485 and/or universal directory 486 to the example controller module 210 of FIG. 2 upon request. The example slicer and hopper 415 and the example de-slicer and aggregator 445 of FIG. 4 use program titles and/or names, and encrypted pseudorandom seeds from metadata stored and maintained in the media directory 485 and/or universal directory 486. For example, for a piece of media recorded by another media device 102-106 and comprised of media slices to be collected and aggregated, the example slicer and hopper 415 (a) obtains the program name from the metadata data for the piece of media from its universal directory 486, (b) obtains the encrypted pseudorandom seed from the metadata data, (c) sends the encrypted pseudorandom seed to the smart card 225 (FIG. 2) to obtain the pseudorandom seed and (d) determines the sequence of media devices 101-106 from which the media slices should be obtained based on the pseudorandom seed and the program title.

The media directory 485 and the universal directory 486 may be stored using any of a variety of table(s), data structure(s) and/or database(s) that are stored in, for example, any of a variety of memory(-ies) and/or machine accessible file(s) 487. In the example system of FIG. 1, a media device's media directory 485 is stored in non-volatile storage such as the storage 250 (FIG. 2) while its universal directory 486 is stored in volatile storage and/or buffer such as a RAM associated with the control module 455 and/or the controller module 210 (FIG. 2), and/or the example storage 241. Additionally or alternatively, the media directory 485 and the universal directory 486 may be stored together in a common data structure. Example data structures for storing the media directory 485 and the universal directory 486 are discussed below in connection with FIGS. 14 and 17, respectively.

To maintain a list 495 of media devices 101-106 to which a particular media device 101 is communicatively coupled, the example control module 455 of FIG. 4 includes a network probe 490. The example network probe 490 of FIG. 4 transmits, receives and/or exchanges messages to determine which media devices 102-106 are active and/or to which of the media devices 102-106 the media devices 101 is currently communicatively coupled. The network probe 490 of FIG. 4 updates its device list 495 in response to messages received from other media devices 102-106. An example manner of implementing the example network probe 490 is discussed below in connection with FIGS. 5 and 6. Example messages that may be used to transmit, send and/or exchange directory information are discussed below in connection with FIGS. 19 and 20.

The device list 495 may be stored using any of a variety of table(s), data structure(s) and/or database(s) that are stored in, for example, any of a variety of memory(-ies) and/or machine accessible file(s) 497. In the example of FIG. 4, the device list 394 is stored in volatile storage and/or buffer such as a RAM associated with the control module 455 and/or the controller module 210 (FIG. 2), and/or the example storage 241. An example data structure for storing the device list 495 is discussed below in connection with FIG. 18.

While an example distributed media module 205 has been illustrated in FIG. 4, the elements, modules, logic, sub-systems and/or devices illustrated in FIG. 4 may be combined, re-arranged, eliminated and/or implemented in any of a variety of ways. Further, the example encrypter 410, the example slicer and hopper 415, the example encrypter 425, the example communications controller 430, the example de-slicer and aggregator 445, the example control module 455, the example decrypter 460, the example decrypter 465, the example transcoder 470, the example directory manager 480, the example network probe and/or the example distributed media module 205 of FIG. 4 may be implemented by hardware, software, firmware and/or any combination of hardware, software and/or firmware. Moreover, the example distributed media module 205 may include additional elements, modules, logic, sub-systems and/or devices than those illustrated in FIG. 4 and/or may include more than one of any or all of the illustrated elements, modules, sub-systems and/or devices.

FIGS. 5, 6, 7, 8, 9, 10, 11, 12 and 13 are flowcharts representative of example processes that may be carried out to implement the example distributed media module 205 and/or, more generally, the example media devices 101-106 of FIGS. 1, 2, 3 and/or 4 to perform distributed media-protection and/or distributed media-aggregation. The example processes of FIGS. 5, 6, 7, 8, 9, 10, 11, 12 and/or 13 may be executed by a processor, a controller and/or any other suitable processing device (e.g., the example CPU 211 discussed above in connection with FIG. 2, a processor associated with the example motherboard 320 discussed above in connection with FIG. 3, and/or an example processor 2105 discussed below in connection with FIG. 21). For example, the example processes of FIGS. 5, 6, 7, 8, 9, 10, 11, 12 and/or 13 may be embodied in coded instructions stored on a tangible medium such as a flash memory, read-only memory (ROM) and/or RAM associated with the processor. Alternatively, some or all of the example processes of FIGS. 5, 6, 7, 8, 9, 10, 11, 12 and/or 13 may be implemented using any of a variety of application specific integrated circuit(s) (ASIC), programmable logic device(s) (PLDs), field programmable logic device(s) (FPLD), discrete logic, discrete gate(s), register(s), hardware, firmware, etc. Also, some or all of the example processes shown in the flowcharts of FIGS. 5, 6, 7, 8, 9, 10, 11, 12 and/or 13 may be implemented manually or as combinations of any of the foregoing techniques, for example, a combination of firmware and/or software and hardware. Further, although the example processes of FIGS. 5-13 are described with reference to the flowcharts of FIGS. 5-13, persons of ordinary skill in the art will readily appreciate that many other methods of implementing the example distributed media module 205 and/or, more generally, the example media devices 101-106 of FIGS. 1, 2, 3 and/or 4 may be employed. For example, the order of execution of the blocks may be changed, and/or some of the blocks described may be changed, eliminated, sub-divided, or combined. Additionally, persons of ordinary skill in the art will appreciate that the example processes of FIGS. 5, 6, 7, 8, 9, 10, 11, 12 and/or 13 may be carried out sequentially and/or carried out in parallel by, for example, separate processing thread(s), processor(s), device(s), circuit(s), etc.

Figure 5:
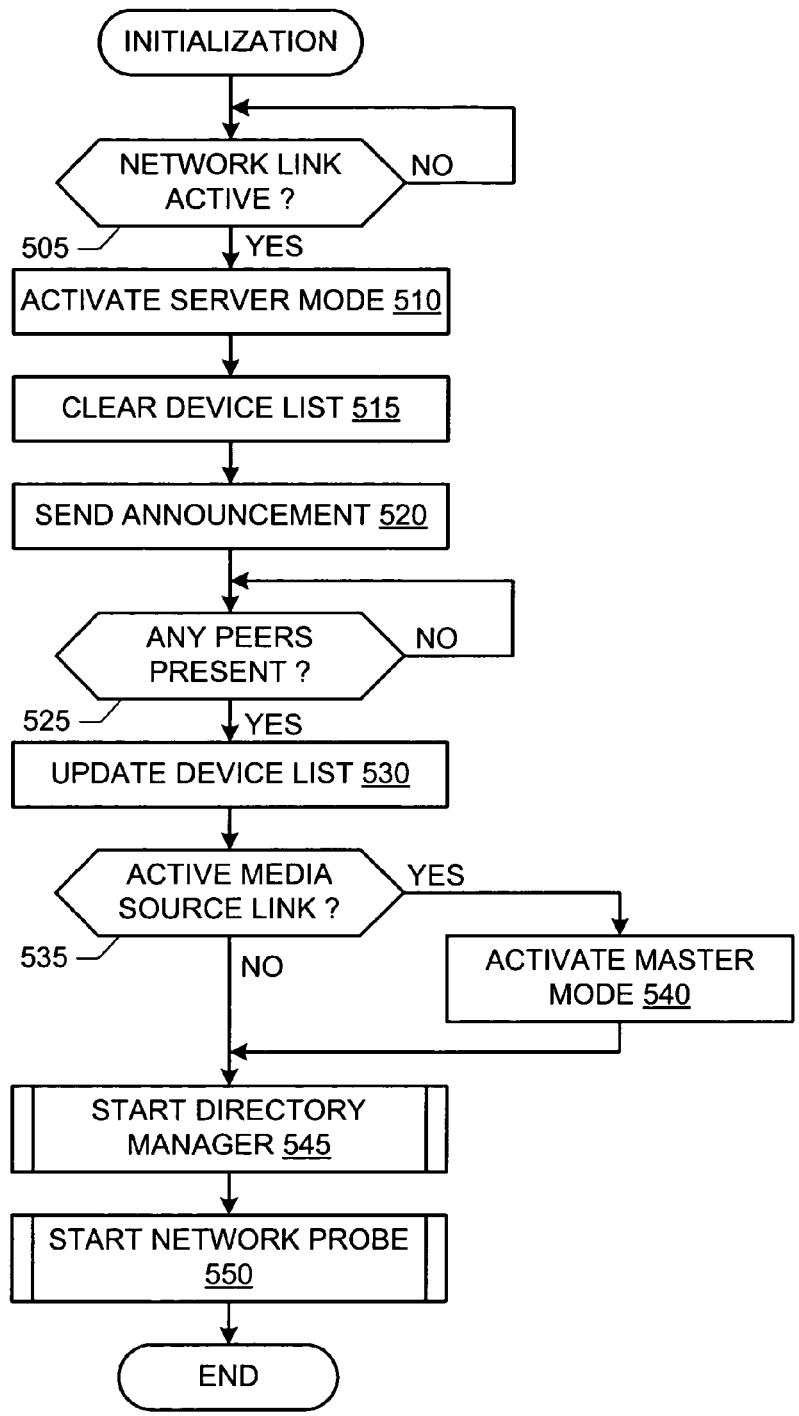
FIG. 5 is a flowchart representative of an example process that may be carried out to initialize the example distributed media module of FIGS. 2, 3 and/or 4.

FIG. 5 is a flowchart representative of an example process that may be carried out to initialize a distributed media module (e.g., the example distributed media module 205 of FIGS. 2, 3 and/or 4). The example process of FIG. 5 begins when a distributed media module is initialized and/or powered on. The distributed media module (e.g., the example controller module 455 of FIG. 4) waits for communications link to, for example, the Internet 125 and/or a LAN 140 to be present and active (block 505). Once a communications link is present and active (block 505), the distributed media module activates a server mode indicating that the distributed media module and/or, more generally, the media device to which the distributed media module belongs is able to participate in and/or utilize distributed media-protection and/or distributed media-aggregation (block 510).

The controller module clears its device list (e.g., the example device list 495 of FIGS. 4 and/or 18) (block 515), sends an announcement (e.g., the example announcement 2025 of FIGS. 19 and 20) via its network interface (e.g., the example network interface 255 of FIG. 2) (block 520) and waits for a response (e.g., the example response 2025 of FIGS. 19 and 20) from at least one other media device 102-106 (block 525). When the controller module receives at least one response to its announcement (block 525), the controller updates its device list based on the received responses (block 530).

If the controller module has an active and/or available communication link and/or signal to receive media from a content provider (e.g., a satellite signal) (block 535), the controller module activates a master mode indicating that the distributed media module and/or, more generally, the media device to which the distributed media module belongs is able to receive pieces of media, slice and/or segment pieces of received media and/or provide and/or distribute media slices and/or segments to other media devices 102-106 (block 540).

Figure 6:
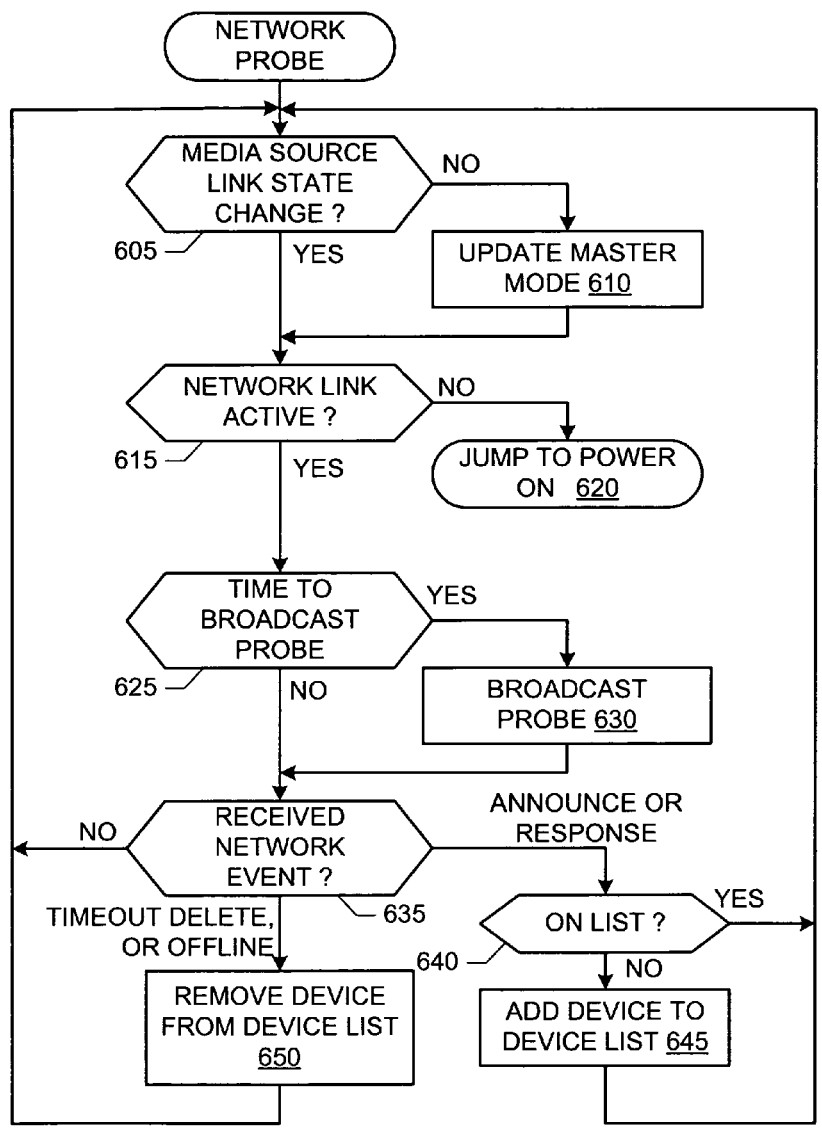
FIG. 6 is a flowchart representative of an example process that may be carried out to implement the example network probe of FIG. 4.
Figure 7:
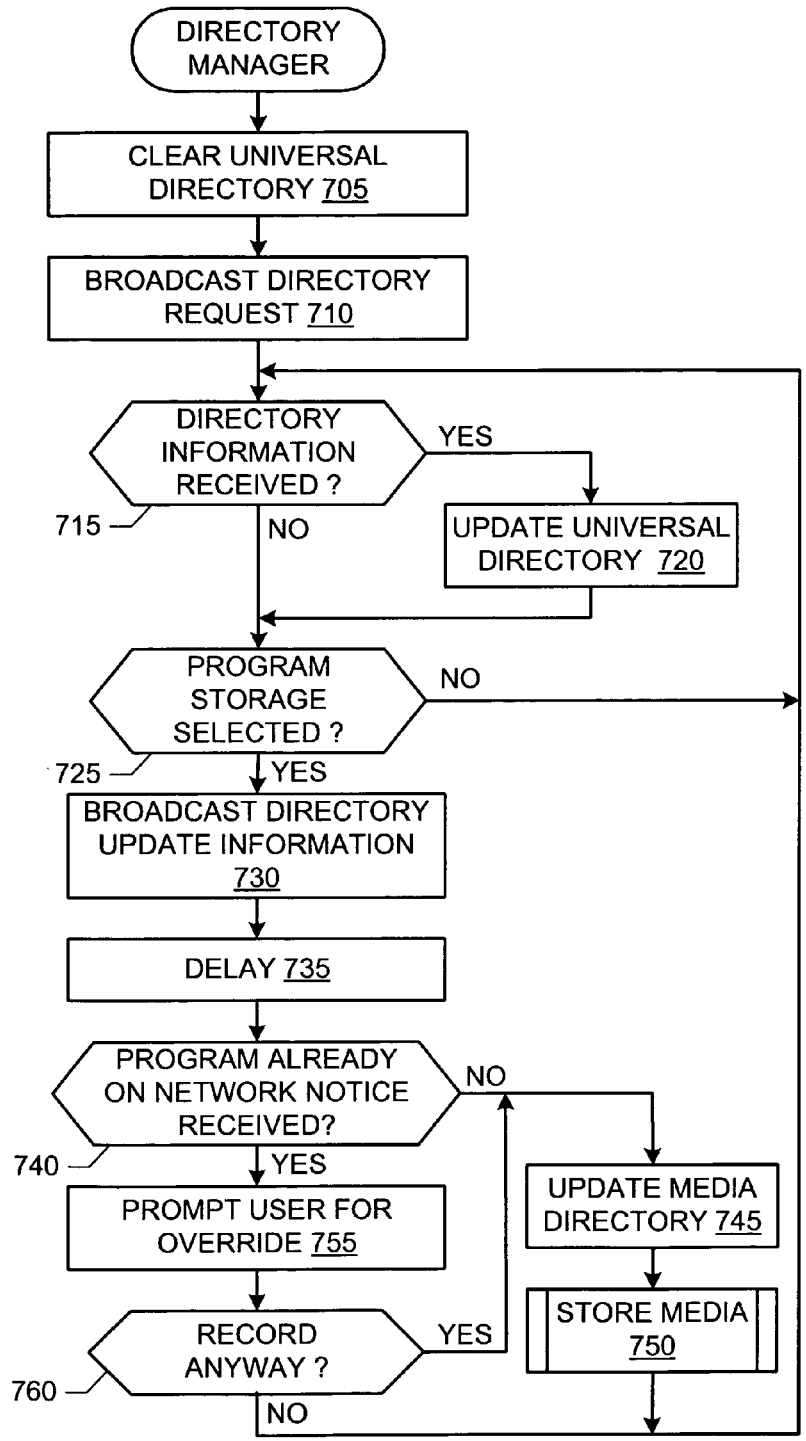
FIG. 7 is a flowchart representative of an example process that may be carried out to implement the example directory module of FIG. 4.

The controller module then starts a directory manager (e.g., the example directory manager 480 of FIG. 4) by, for example, initiating a software thread that carries out the example process illustrated in FIG. 7 (block 545) and starts a network probe (e.g., the example network probe 490 of FIG. 4) by, for example, initiating a software thread that carries out the example process illustrated in FIG. 6 (block 550). Control then exits from the example process of FIG. 5.

FIG. 6 is a flowchart representative of an example process that may be carried out to implement a network probe (e.g., the example network probe 490 of FIG. 4). The example process of FIG. 6 monitors the state of media source link(s) from content provider(s), a network link to one or more other media devices 102-106 and maintains a list of network devices (e.g., the example network list 495 of FIGS. 4 and/or 18).

If the state of its media source link(s) from content provider(s) (e.g., a satellite signal) has changed (e.g., was not available but is now not available, or vice versa) (block 605), the network probe accordingly activates or de-activates its media master mode (block 610). Control then proceeds to block 615. If the state of its media source link(s) has not changed (block 605), control proceeds to block 615 without changing the media master mode.

If the network link is no longer active (block 615), control exits from the example process of FIG. 6 to, for example, the example initialization process of FIG. 5 to wait for the network link to become active (block 620). If the network link is still active (block 615), control proceeds directly to block 625. Alternatively and/or additionally, any of a variety of error handling could be performed at block 620.

If it is time to broadcast a network probe (e.g., the example probe 2020 of FIGS. 19 and 20) (block 625), the network probe broadcasts a network probe (block 630). Control then proceeds to block 635. If the time to broadcast a network probe has not arrived (block 625), control proceeds to block 635 without broadcasting a probe. The network probe may broadcast probes periodically and/or aperiodically. An example network probe checks the state of a countdown timer at block 625 so that a network probe is periodically broadcast.

If a network message is not received (block 635), control returns to block 605 to check the state of its media source link(s) (block 605). If an offline message (e.g., the example offline 2030 of FIGS. 19 and 20) is received from a media device, a delete message (e.g., the example 2035 of FIGS. 19 and 20) is received from a media device and/or communications to a media device has timeout due to repeated failures to response to a broadcast probe (e.g., failure to respond to three (3) probes) (block 635), the network probe removes the media device from its device list (e.g., the example device list 495 of FIGS. 4 and/or 18) (block 650).

If an announce (e.g., the announce 2020 of FIGS. 19 and 20) is received from a media device or a response (e.g., the response 2020 of FIGS. 19 and 20) is received from a media device (block 635), the network probe determines if the media device is in its device list (block 640). If the media device is in its device list (block 640), control returns to block 605 to check the state of its media source link(s) (block 605). If the media device is not in its device list (block 640), the network probe adds the media device to its device list (block 645). Control then returns to block 605 to check the state of its media source link(s) (block 605).

FIG. 7 is a flowchart representative of an example process that may be carried out to implement a directory module (e.g., the example directory manager 480 of FIG. 4). The example process of FIG. 7 sends information from a media directory (e.g., the example media directory 485 of FIGS. 4 and/or 14) for media for which the media device 101 is a master to other media devices 102-106 and maintains and/or updates a universal directory (e.g., the example universal directory 486 of FIGS. 4 and/or 17) based upon directory information received from the other media devices 102-106.

The example process of FIG. 7 begins with a directory manager clearing and/or initializing its universal directory information (block 705) and broadcasting a request for universal directory information (e.g., the example request 2040 of FIGS. 19 and 20) (block 710).

If universal directory information is received from one of the other media devices 102-106 (block 715), the directory manager updates its universal directory (block 720). Control then proceeds to block 725. If universal directory information is not received (block 720), then control proceeds to block 725 without updating the universal directory.

If a selection has not been made to store and/or record a piece of media (block 725), control returns to block 715 to check if universal directory information was received. If selection has been made to store and/or receive a piece of media (block 725), the directory manager broadcasts a directory update message (e.g., the example update 2055 of FIGS. 19 and 20) and waits to allow other media devices 102-106 to respond (block 735).

After waiting (block 735), the directory manager determines if any media Devices 102-106 responded with a response message (e.g., the response 2045 of FIGS. 19 and 20) (block 740). If no responses are received indicating that another media device 102-106 has already stored and/or recorded the selected piece of media (block 740), the directory manager updates its media directory (e.g., the example media directory 485 of FIGS. 4 and/or) to include the piece of media to be recorded and/or stored (block 745) and starts storage and/or recording of the selected piece of media by initiating, for example, the example process of FIGS. 8 and 9 (block 750).

If a response is received from a media device 102-106 indicated that it will and/or has already stored and/or recorded the selected piece of media (block 740), the directory manager prompts and/or causes the user to be prompted (block 755). An example prompt inquires whether the selected piece of media should be recorded anyway.

If the user indicates that the piece of media should be recorded anyway (block 760), control proceeds to block 745 to update the media directory and then starting recording. If user does not indicate that the piece of media should be recorded anyway (block 760), control returns to block 715 without recording or storing the selected piece of media.

Additionally or alternatively, the directory manager at block 760 may not allow a user to record an already recorded and/or stored piece of media. For example, a content provider may configure one or more of the media devices 101-106 to never duplicatively store and/or record a piece of media.

Figure 8:
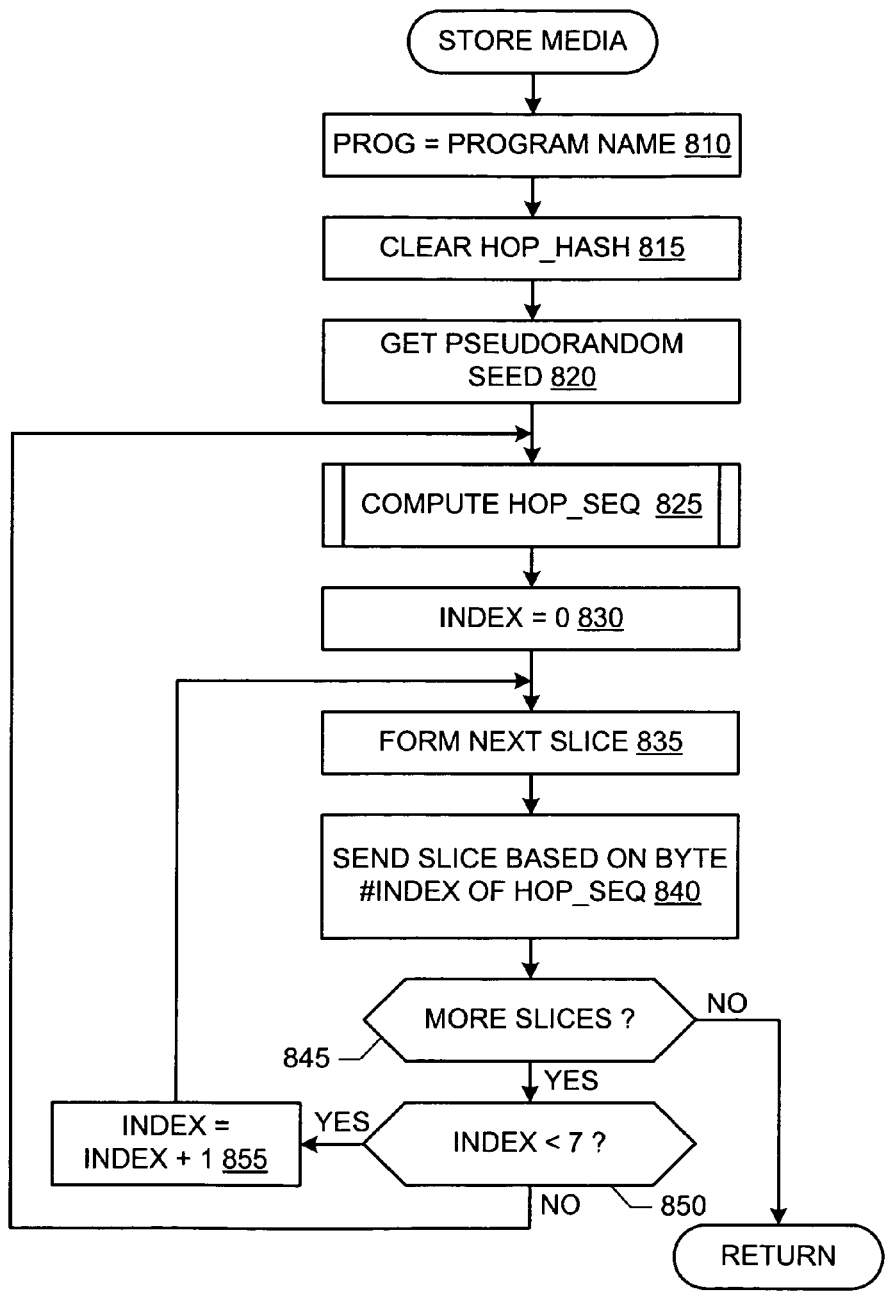
FIG. 8 is a flowchart representative of an example process that may be carried out to distribute media slices.

FIG. 8 is a flowchart representative of an example process that may be carried out to store and/or record a piece of media by creating and distributing media slices. The example process of FIG. 8 begins when a piece of media is selected for recording and/or storing. For instance, the example process of FIG. 8 may be carried out as part of, separate from and/or as initiated by the example process of FIG. 7.

A slicer and hopper (e.g., the example slicer and hopper 415 of FIG. 4) sets a local variable PROG equal to the name and/or name of the program (i.e., piece of media) to be recorded and/or stored (block 810) and resets and/or clears a HOP_HASH variable to known state such as zero (0) (block 815).

Using the encrypted pseudorandom seed from the metadata for the program and a security device (e.g., the example smart card 225 of FIG. 2), the slicer and hopper obtains the pseudorandom seed for the program (block 820).

Figure 9:
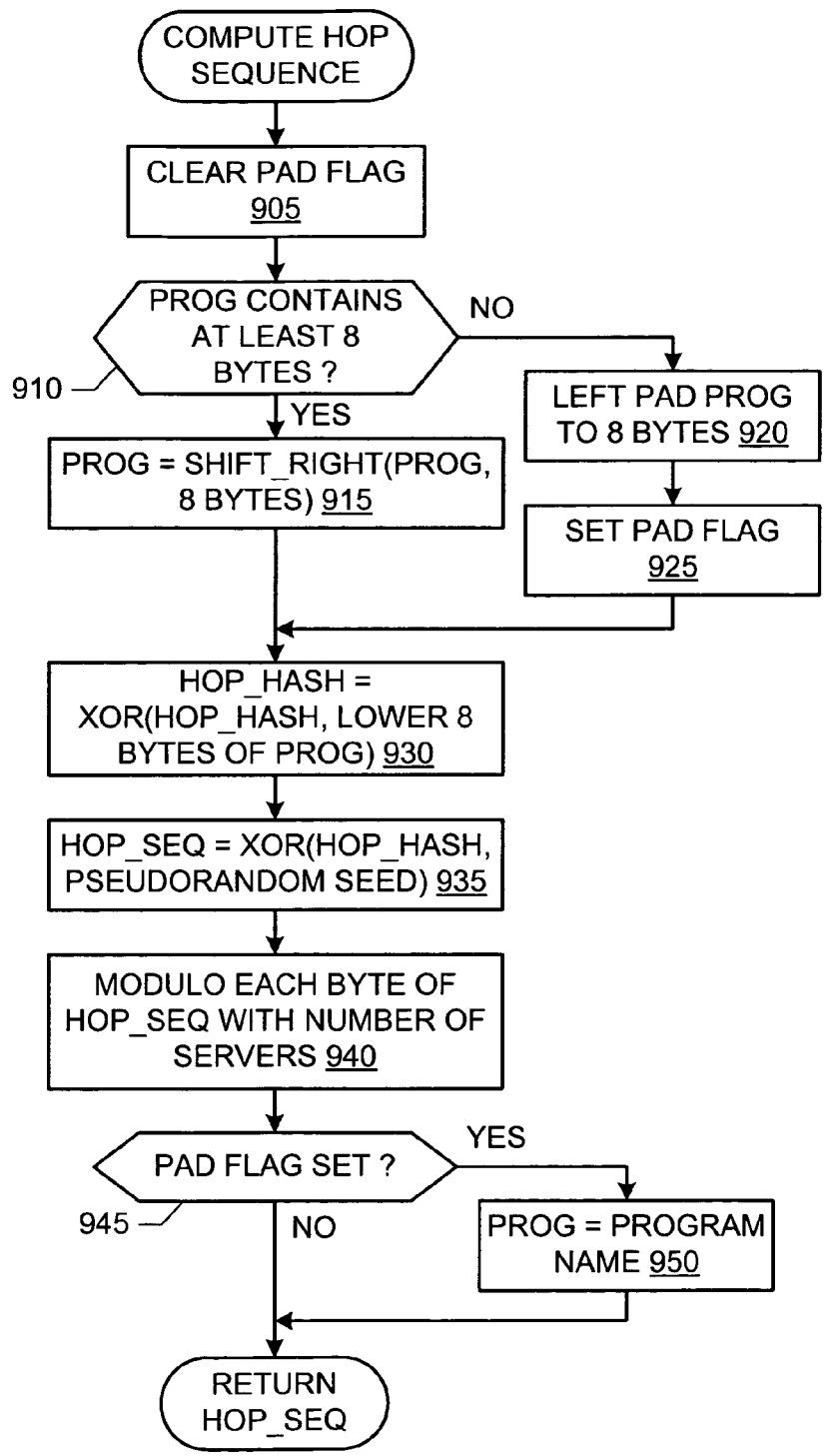
FIG. 9 is a flowchart representative of an example process that may be carried out to compute a hop sequence for distributing and/or collecting media slices.

Using, for example, the example process of FIG. 9, the slicer and hopper computes a set of destinations (e.g., eight (8) destinations for the next eight (8) media slices) (block 825). The example process of FIG. 9 returns an eight (8) byte HOP_SEQ, where each of the bytes of HOP_SEQ represents a destination for a media slice. The example process of FIG. 9 may, of course, return any number of destinations (e.g., sixteen (16)) using any of a variety of data types (e.g., sixteen (16) 32-bit words). The slicer and hopper sets a variable INDEX to zero (0) (block 830).

The slicer and hopper forms and/or creates the next media slice (block 835) and sends the created media slice to the media device 101-106 based on byte #INDEX of HOP_SEQ via the communications controller 430 (block 840). If there is at least one more media slice to be created for the piece of media (block 845) and if the value of INDEX is less then seven (7) (block 850), the value of INDEX is incremented (block 855). Control then returns to block 835 to create and send the next media slice.

Returning to block 850, if INDEX is equal to seven (7) (block 850), control returns to block 825 to compute a new HOP_SEQ.

Returning to block 845, if there are no more media slices to create and/or send (block 845), control exits from the example process of FIG. 8.

FIG. 9 is a flowchart representative of an example process that may be carried out to compute a hop sequence for distributing media slices. The example process of FIG. 9 returns an eight (8) byte HOP_SEQ variable, where each of the bytes of HOP_SEQ represents a destination for a media slice. The example process of FIG. 9 may, of course, return any number of destinations (e.g., sixteen (16)) using any of a variety of data types (e.g., sixteen (16) 32-bit words).

The example process of FIG. 9 begins by clearing a flag PAD (e.g., setting its value to FALSE) (block 905). If the variable PROG contains at least eight (8) bytes (block 910), PROG is right shifted by eight (8) bytes (block 915). If the variable PROG holds less than eight (8) bytes (block 910), PROG is left padded to eight (8) bytes with, for example, zeros (block 920) and sets the flag PAD (e.g., setting its value to TRUE) (block 925).

HOP_HASH is updated by computing an exclusive OR (i.e., XOR) of each of eight (8) bytes of HOP_HASH with respective ones of the lower bytes of PROG (block 930). HOP_SEQ is computed as an XOR of each of the eight (8) bytes of HOP_HASH with respective bytes of the pseudorandom seed for the piece of media (block 935). Next the value of each of the eight (8) bytes of HOP_SEQ modulo the number of present devices in the media device's device list is computed (block 940).

If the PAD flag is set (block 945 PROG is reloaded with the program name and/or title of the piece of media being recorded (block 950). Control then returns HOP_SEQ from the example process of FIG. 9 to, for example, the example process of FIGS. 8 or 11. If the PAD flag is not set (block 945), then control returns HOP_SEQ from the example process of FIG. 9 to, for example, the example process of FIGS. 8 or 11.

While an example process for computing a hop sequence is illustrated in FIG. 9, any of a variety of hop sequence computing and/or determining method(s), technique(s) and/or algorithm(s) may be used. An example process ensures that sequential media slices are not stored on the same media device to ensure that FEC protection is adequate to bridge a failed media device. Another example process factors in the remaining storage capacity of a media device. Another example process stores a large portion of the media slices on the master media device and distributes a small number of media slices for protection purposes. Other examples abound.

Figure 10:
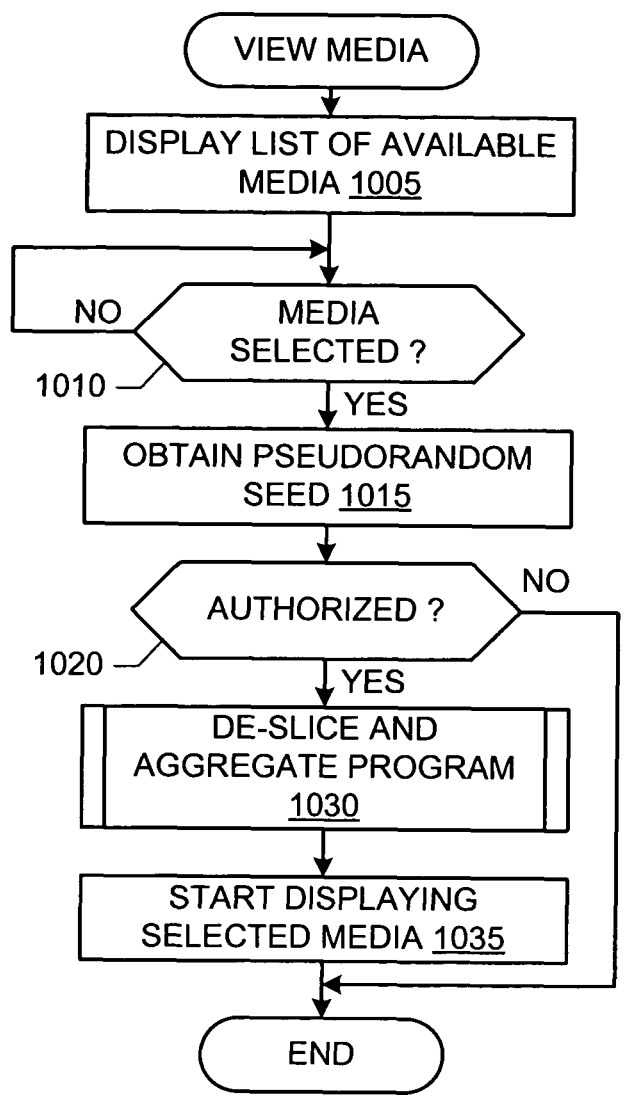
FIG. 10 is a flowchart representative of an example process that may be carried out to view distributed media.

FIG. 10 is a flowchart representative of an example process that may be carried out to view distributed media. The example process of FIG. 10 collects distributed media slices, aggregates the collected media slices and starts playback of the assembled media stream. The example process of FIG. 10 begins with a media device (e.g., the example media device 101) displaying a list of available pieces of media for playback (block 1005). The displayed list of available pieces of media contains any of the pieces of media listed in the media device's directory (e.g., the example media directory 485 of FIGS. 4 and/or 14) and/or the media device's universal directory (e.g., the example universal directory 486 of FIGS. 4 and/or 17).

The media device waits for a user to select one of the listed pieces of media (block 1010). When a piece of media is selected (block 1010), a de-slicer and aggregator (e.g., the example de-slicer and aggregator 445 of FIG. 4) obtains the pseudorandom seed for the program by using the encrypted pseudorandom seed from the metadata for the piece of media and a security device (e.g., the example smart card 225 of FIG. 2) (block 1015).

If the user and/or the media device is not authorized to view and/or playback the selected piece of media (block 1020), control exits from the example process of FIG. 10. If the user and/or the media device is authorized to view and/or playback the selected piece of media (block 1020). In an example, authorization to view and/or playback a piece of media is based on an ability to correctly decrypt the encrypted pseudorandom seed from the metadata. Additionally or alternatively, at block 1005 only those pieces of media that the user and/or the media device 101 are authorized to view and/or playback are listed.

Figure 11:
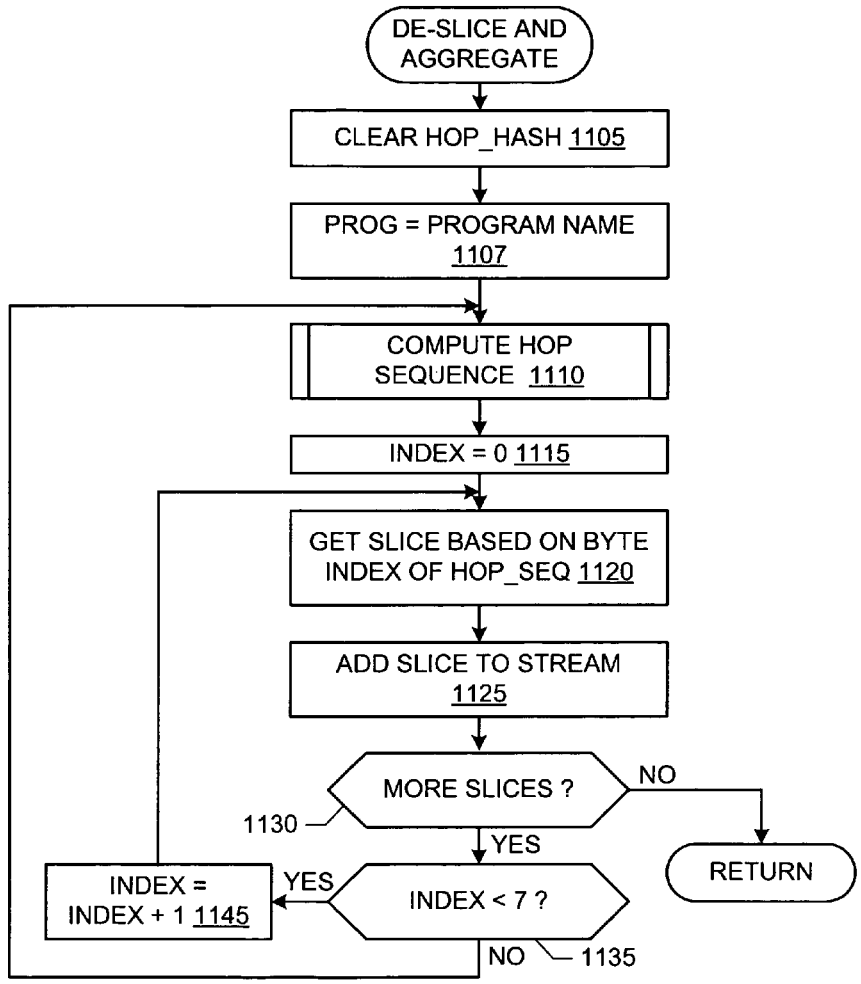
FIG. 11 is a flowchart representative of an example process that may be carried out to collect distributed media slices.

The de-slicer and aggregator starts collecting and aggregating media slices by, for example, carrying out the example process of FIG. 11 (block 1030) and starts playback of the assembled media stream (block 1035). Control then exits from the example process of FIG. 10.

FIG. 11 is a flowchart representative of an example process that may be carried out to collect and aggregate distributed media slices. The example process of FIG. 11 begins with a de-slicer and aggregator (e.g., the example de-slicer and aggregator 445 of FIG. 4) clearing or resetting a HOP_HASH variable to known state such as zero (0) (block 1105) and setting a local variable PROG equal to the name and/or name of the selected piece of media (block 1107).

Using, for example, the example process of FIG. 9, the slicer and aggregator computes the locations where the next eight (8) media slices are stored (block 1110). The example process of FIG. 9 returns an eight (8) byte HOP_SEQ, where each of the bytes of HOP_SEQ represents the location of a media slice. The example process of FIG. 9 may, of course, return any number of locations (e.g., sixteen (16)) using any of a variety of data types (e.g., sixteen (16) 32-bit words).

The slicer and aggregator sets a variable INDEX to zero (0) (block 1115). The slicer and aggregator obtains the next media slice based on byte #INDEX of HOP_SEQ via a communications controller (e.g., the example communications controller 430 of FIG. 4) (block 1120) and adds the obtained media slice to an aggregate media stream (e.g., the example media stream 460 of FIG. 4) (block 1125). If there is at least one more media slice to collect and add to the media stream (block 1130) and if the value of INDEX is less then seven (7) (block 1135), the value of INDEX is incremented (block 1145). Control then returns to block 1120 to get the next media slice.

Returning to block 1130, if INDEX is equal to seven (7) (block 1130), control returns to block 1110 to compute a new HOP_SEQ.

Figure 12:
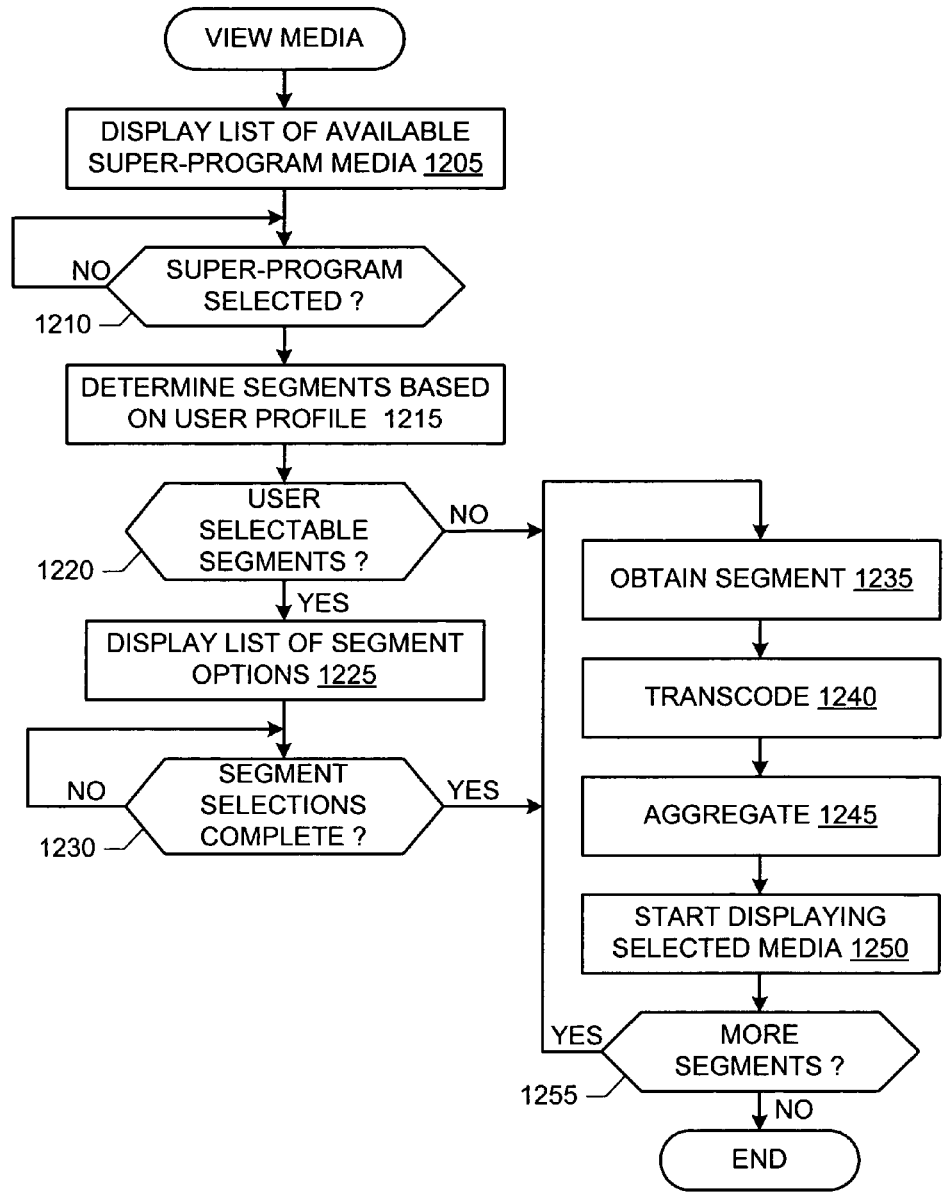
FIG. 12 is a flowchart representative of an example process that may be carried out to collect super-program media segments.
Figure 13:
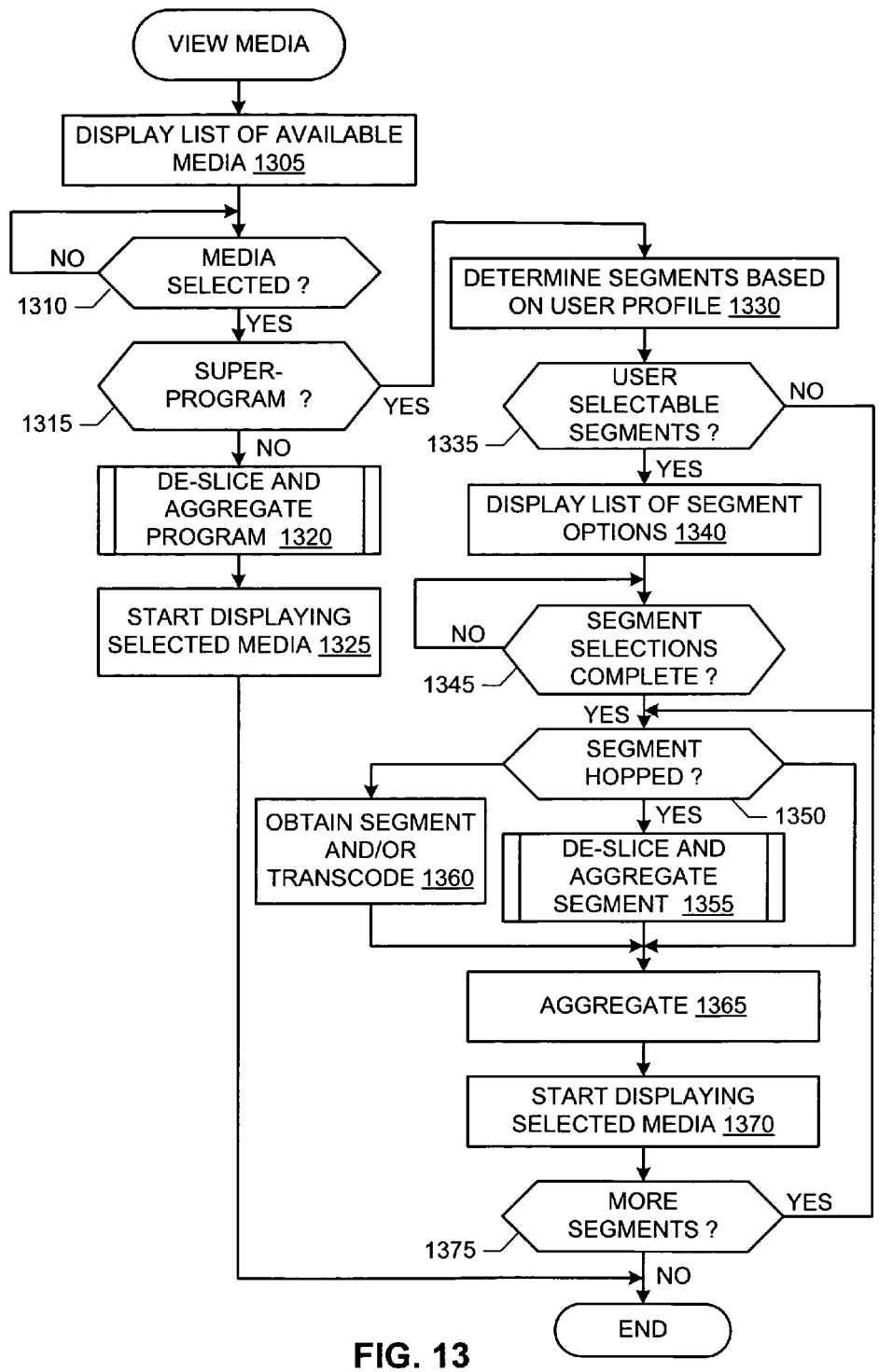
FIG. 13 is a flowchart representative of an example process that may be carried out to collect distributed media slices and/or collect super-program media segments.

Returning to block 1130, if there are no more media slices to obtain (block 1130), control exits from the example process of FIG. 11 to, for example, the example process of FIGS. 10, 12 or 13.

FIG. 12 is a flowchart representative of an example process that may be carried out to collect media segments to form super-programs. The example process of FIG. 12 begins with a media device (e.g., the example media device 110) determining and displaying a list of available super-programs (block 1205).

The media device waits for a user to select one of the listed super-programs (block 1210). When a super-program is selected (block 1210), a de-slicer and aggregator (e.g., the example de-slicer and aggregator 445 of FIG. 4) determines one or more media segments for the super-program based on, for example, a user profile (block 1215). Example media segments selected by the de-slicer and aggregator include one or more commercials and/or advertisements. If there are no user selectable media segments, control proceeds to block 1235 to start obtaining media segments. If there are user selectable media segments (block 1220), a list of optional media segments is presented to the user (block 1225). Example optional media segments include alternative portions of a program, an alternative ending, episodes of a sitcom, etc. Once optional media segments are selected by the user (block 1230), control proceeds to block 1235 to start obtaining media segments.

At block 1235, the de-slicer and aggregator obtains a first media segment for the super-program (block 1235), transcodes the media segment if necessary (block 1240) and adds the possibly transcoded media segment to a media stream (e.g., the example media stream 475 of FIG. 4) (block 1245). Once the first media segment has been added to the media stream, playback of the media stream can begin (block 1250). The locations of media segments are determined using the media device's media directory (e.g., the example media directory 485 of FIGS. 4 and/or 14) and/or the media device's universal directory (e.g., the example universal directory 486 of FIGS. 4 and/or 17).

If there are no more media segments to obtain for the super-program (block 1255), control exits from the example process of FIG. 12. If there is at least one more media segment to obtain for the super-program (block 1255), control returns to block 1235 to obtain the next media segment.

At block 1210, once a super-program has been selected (block 1210), the de-slicer and aggregator may start obtaining media segments that must included as part of the super-program (e.g., the non-commercial portions of a sitcom) even while media segment selections and/or prompting are occurring.

FIG. 13 is a flowchart representative of an example process that may be carried out to collect distributed media slices and/or collect super-program media segments. The example process of FIG. 13 begins with a media device (e.g., the example media device 110) displaying a list of available pieces of media and/or super-programs (block 1305).

The media device waits for a user to select one of the listed pieces of media and/or super-programs (block 1310). If the selection is not a super-program (block 1315), a de-slicer and aggregator (e.g., the example de-slicer and aggregator 445 of FIG. 4) starts the collection and aggregation of media slices by, for example, initiating the example process of FIG. 11

(block 1320) and starts playing the created media stream (block 1325). Control then exits from the example process of FIG. 13.

If a super-program is selected (block 1315), the de-slicer and aggregator determines one or more media segments for the super-program based on, for example, a user profile (block 1330). Example media segments selected by the de-slicer and aggregator include one or more commercials and/or advertisements. If there are no user selectable media segments, control proceeds to block 1350 to start obtaining media segments. If there are user selectable media segments (block 1335), a list of optional media segments is presented to the user (block 1340). Example optional media segments include alternative portions of a program, an alternative ending, episodes of a sitcom, etc. Once optional media segments are selected by the user (block 1345), control proceeds to block 1350 to start obtaining media segments.

At block 1350, the de-slicer and aggregator determines whether the next media segment is sliced and distributed (block 1350). If the next segment is sliced and distributed (block 1350), the de-slicer and aggregator collects and aggregates the media slices for the media segment using, for example, the example process of FIG. 11 (block 1355). If the next segment is not sliced and distributed (block 1350), the de-slicer and aggregator obtains the media segment and transcodes the media segment if necessary (block 1360).

The de-slicer and aggregator adds the media segment from block 1355 or block 1360 to a media stream (e.g., the example media stream 475 of FIG. 7) (block 1365). Once a first media segment has been added to the media stream, playback of the media stream can begin (block 1370). The locations of media segments are determined using the media device's directory.

If there are no more media segments to obtain for the super-program (block 1375), control exits from the example process of FIG. 13. If there is at least one more media segment to obtain for the super-program (block 1375), control returns to block 1350 to obtain the next media segment.

Alternatively, at block 1315, once a super-program has been selected (block 1315), the de-slicer and aggregator may start obtaining media segments that must included as part of the super-program (e.g., the non-commercial portions of a sitcom) even while media segment selections and/or prompting are occurring.

FIG. 14 illustrates an example data structure for storing a media directory (e.g., the example media directory 485 of FIG. 4). The example media directory 485 of FIG. 14 contains a plurality of entries and/or slots 1405 for respective ones of recorded and/or stored pieces of media and/or media segments. The maximum number of slots 1405 is chosen so that the example media directory 485 of FIG. 14 is an even multiple of a native block size (e.g., a disk sector and/or cluster size) for a particular storage device (e.g., a HDD) upon which the media directory 485 is stored.

To specify the number of slots 1405 of the example media directory 485 that are currently active (i.e., the number of pieces of media current being stored by the example media device), the example media directory 485 of FIG. 14 includes a header 1410 having a slots used field 1415. The example slots used field 1415 contains the number of active slots.

To specify a linkage to a second directory data structure 485 when the size of a directory structure 485 exceeds a pre-determined limit, the example header 1410 of FIG. 14 includes any of a variety directory continuation information field 1420. To support future capabilities and/or options, the example media directory 485 of FIG. 14 includes a reserved field 1425. To pad the size of the example media directory 485 of FIG. 14 to a native block size boundary, the example data structure 485 of FIG. 14 includes padding 1430.

To record a unique program identifier, each of the example entries 1405 of FIG. 14 has a program identifier field 1435. The example program identifier field 1435 contains any variety of alphanumeric characters, bits, bytes and/or words to uniquely identify a piece of media, media segment and/or super-program.

To record a title and/or name, each of the example entries 1405 of FIG. 14 has a title field 1440. The example title field 1440 of FIG. 14 contains an ASCII based alphanumeric program title.

To record a description, each of the example entries 1405 of FIG. 14 has a description field 1445. The example field 1445 of FIG. 14 contains an ASCII based alphanumeric description of the program.

To record program attributes (e.g., length), each of the example entries 1405 of FIG. 14 has an attributes field 1450. The example attributes field 1450 of FIG. 14 contains one or more values that represent any of a variety of attributes of the program such as who owns the piece of media or ratings (e.g., to support parental controls).

To record metadata, each of the example entries 1405 of FIG. 14 has a metadata field 1455. The example metadata field 1455 of FIG. 14 contains metadata for the program. Example metadata 1455 is discussed below in connection with FIG. 15.

To record encryption information, each of the example entries 1405 of FIG. 14 has an encryption information field 1460. The example encryption information field 1460 of FIG. 14 contains one or more parameters, encryption secrets and/or encryption keys that specify any encryption applied to the program.

To record a first segment and/or slice identifier, each of the example entries 1405 of FIG. 14 has a first segment field 1465. The example first segment field 1465 of FIG. 14 contains a value that uniquely identifies the first media segment and/or media slice of the program.

To record a program access count, each of the example entries 1405 of FIG. 14 has a program access count field 1470. The example program access count field 1470 of FIG. 14 contains a count of the number of times the program was accessed and/or played back.

To support future options and/or capabilities, each of the example entries 1405 of FIG. 14 has a currently used reserved field 1475.

FIG. 15 is an example data structure for storing the metadata (e.g., the example metadata 1455 of FIG. 14). To store information concerning which media segments make up a program, the example metadata 1455 of FIG. 15 includes any of a variety of segment information 1505. The example segment information 1505 may be formatted and/or structured in accordance with any of a variety of current and/or future media storage standards. For example, the segment information 1505 may contain and/or specify a list of media segments that make up the program.

To store an encrypted pseudorandom seed used to slice and distribute, and/or collect and aggregate media slices, the example metadata 1455 of FIG. 15 includes an encrypted pseudorandom seed field 1510. The example encrypted pseudorandom seed field 1510 contains an eight (8) byte encrypted pseudorandom seed.

To store any of a variety of additional and/or alternative metadata values, data and/or information, the example metadata of FIG. 15 includes an additional metadata field 1515. In an example, the additional metadata field 1515 contains information useful for selecting additional and/or alternative media segments. Example information includes demographics of individuals for which a commercial might be targeted.

FIG. 16 is an example data structure for storing media segments and/or media slices (e.g., the example media segments and/or slices 420 and/or 450). To store information identifying one or more parameters of the media segment and/or slices, the example data structure of FIG. 16 includes a header 1605. To store the encoded (and/or possibly encrypted) data for the media segment and/or slice, the example data structure of FIG. 16 includes a payload 1610.

To record a segment and/or slice identifier, the example data structure of FIG. 16 includes a segment identifier field 1612. The example field 1612 of FIG. 16 contains a value that uniquely identifies the segment and/or slice.

To record a size of the media segment and/or slice, the example data structure of FIG. 16 includes a size field 1615. The example size field 1615 of FIG. 16 contains a value that represents the size of the example payload 1610 in bytes.

To record a cyclic redundancy check (CRC), the example data structure of FIG. 16 includes a CRC field 1620. The example CRC field 1620 of FIG. 16 contains a CRC computed over the example payload 1610.

To record encryption information, the example data structure of FIG. 16 includes an encryption information field 1625. The example encryption information field 1625 of FIG. 16 contains one or more parameters, encryption secrets and/or encryption keys that specify any encryption applied to the example payload 1610.

To record a codec type, the example data structure of FIG. 16 includes a codec type field 1630. The example codec type field 1630 of FIG. 16 specifies the A/V encoding applied to the example payload 1610.

To record a segment access count, the example data structure of FIG. 16 includes a segment access count field 1635. The example segment access field 1635 of FIG. 16 contains a count of the number of times the media segment and/or slice was obtained and/or played back.

To identify the next media segment and/or slice, the example data structure of FIG. 16 includes a next segment identifier field 1640. The example next segment identifier field 1640 of FIG. 16 contains a value that uniquely identifies the next media segment and/or slice.

To support future options and/or capabilities, the example data structure of FIG. 16 includes a reserved field 1645.

FIG. 17 is an example data structure for storing a universal directory (e.g., the example universal directory 486 of FIG. 4), that is, for storing a list of pieces of media recorded and/or stored by other media devices. In the example system of FIG. 1, the example universal directory 486 of FIG. 17 is stored in volatile memory such as RAM and, as such, has not restrictions and/or need to coincide with a native block size.

Many of the fields and/or portions of the example universal directory 486 of FIG. 17 are substantially the same as shown and described above in connection with FIG. 14 and, thus, are not discussed here. Instead, identical fields and portions are illustrated with identical reference numerals in FIGS. 14 and 17, and the interested reader is referred back to the descriptions presented above in connection with FIG. 14.

To conserve storage, the example universal directory 486 of FIG. 17 omits the example description field 1445, first segment identifier field 1465 and the example program access count field 1470 of FIG. 14.

To specify which media device 101-106 stored and/or recorded the program, the example universal directory 486 of FIG. 17 includes a device identifier field 1705. The example device identifier field 1705 of FIG. 17 includes a value that uniquely identifies a media device 101-106.

FIG. 18 is an example data structure for storing a device list (e.g., the example device list 495 of FIG. 4). The example device list 495 of FIG. 18 contains a plurality of entries 1805 for respective ones of communicatively coupled media devices 101-106.

To record a device identifier, each of the example entries 1805 of FIG. 18 includes a device identifier field 1810. The example device identifier field 1810 of FIG. 18 contains a value that uniquely identifies a media device 101-106.

To a presence or absence, each of the example entries 1805 of FIG. 18 includes a present/absent field 1815. The example present/absent field 1815 of FIG. 18 contains a flag that specifies if the corresponding media device 101-106 is present (e.g., flag is TRUE) or absent (e.g., flag is FALSE).

To record a capacity, each of the example entries 1805 of FIG. 18 includes a capacity field 1820. The example capacity field 1820 of FIG. 18 contains a value that represents the remaining storage capacity of the corresponding media device 101-106.

To record properties, the example entries 1805 of FIG. 18 includes a properties field 1825. The example properties field 1825 of FIG. 18 contains any number and/or variety of values, fields and/or characters that specify any of a variety of properties of the corresponding media device such as an associated content provider or a geographic location.

To support future capabilities and/or options, each of the example entries 1805 of FIG. 18 includes a reserved field 1830.

While example data structures have been illustrated in FIGS. 14-18, any of a variety of additional and/or alternative fields, entries, headers, payloads, data structures, tables, arrays, registers, variables, etc. may be used. Moreover, the example data structures of FIGS. 14, 15, 16, 17 and/or 18 may include and/or store any of a variety of additional and/or alternative data and/or information.

FIG. 19 illustrates an example message format that may be used by the example distributed media modules 205 and/or, more generally, the example media devices 101-106 of FIGS. 1, 2, 3 and/or 4 to exchange network probe and/or directory information.

To indicate the device identifier of a media device 101-106 sending the example message of FIG. 19, the example message of FIG. 19 includes a device identifier field 1905. The example device identifier field 1905 contains a value that uniquely identifies a media device 101-106. The device identifier field 1905 may also contain any of a variety of null value and/or indication such as a value of zero to indicate that the message is applicable to all media devices 101-106. 1001941 To specify a sequence number associated with a string of messages, the example message of FIG. 19 includes a transmit sequence number field 1910. Likewise, to specify the transmit sequence number to which a response message is sent, the example message of FIG. 19 includes a receive sequence number field 1915. When responding to a received message, a media device 101-106 places the value from the transmit sequence number field 1910 of the received message into the receive sequence number field 1915 of the transmitted response message. If two or more messages are sent in response to a received messages, the transmit sequence number field 1910 numbers the messages with the receive sequence number field 1915 corresponding to the transmit sequence number 1910 of the received message.

To specify the type of message, the example message of FIG. 19 includes a command field 1920 and a sub-command field 1925. To provide one or more parameters and/or values, the example message of FIG. 19 includes any number of parameter fields 1930. The number of parameter fields 1930 may be either variable (e.g., depends upon the type of message) and/or may be fixed. Example values for the command field 1920, the sub-command field 1925 and the parameter fields 1930 are discussed below in connection with FIG. 20.

To support future options and/or capabilities, the example message of FIG. 19 includes a reserved field 1935.

FIG. 20 illustrates example combinations of commands 1920, sub-commands 1925 and parameter(s) 1930. Each of the combinations illustrated in FIG. 20 are associated with a particular message type 2005.

A first set of message types 2010 are used by network probes (e.g., the example network probe 490 of FIG. 4) to transmit, receive and/or exchange data related to which other media devices 102-106 a media device 101 is communicatively coupled. An example broadcast probe message 2020 contains a command 1920 that requests that other media devices 102-106 respond. An example announce and/or response message 2025 contains a command 1920 that indicates that the media device 101 is present, a sub-command 1925 that indicates the unique device identifier for the media device 101, and one or more parameters 1930 that convey capacity and/or property information (e.g., the example capacity information 1820 and/or the example property information 1825 of FIG. 18). An example offline message 2030 announces to other media devices 102-106 that the media device 101 is going off-line. An example delete message 2030 instructs other media devices 102-106 to delete the media device 101 from their device list.

A second set 2015 of message types are used to transmit, receive and/or exchange directory information. An example directory request message 2040 requests that other media devices 102-106 send their directory information. An example directory response 2045 conveys the directory information 1930 for the media device 101 specified in the sub-command field 1925. An example directory modification message 2055 includes other media devices 102-106 to add, modify and/or delete a specified directory.

Figure 21:
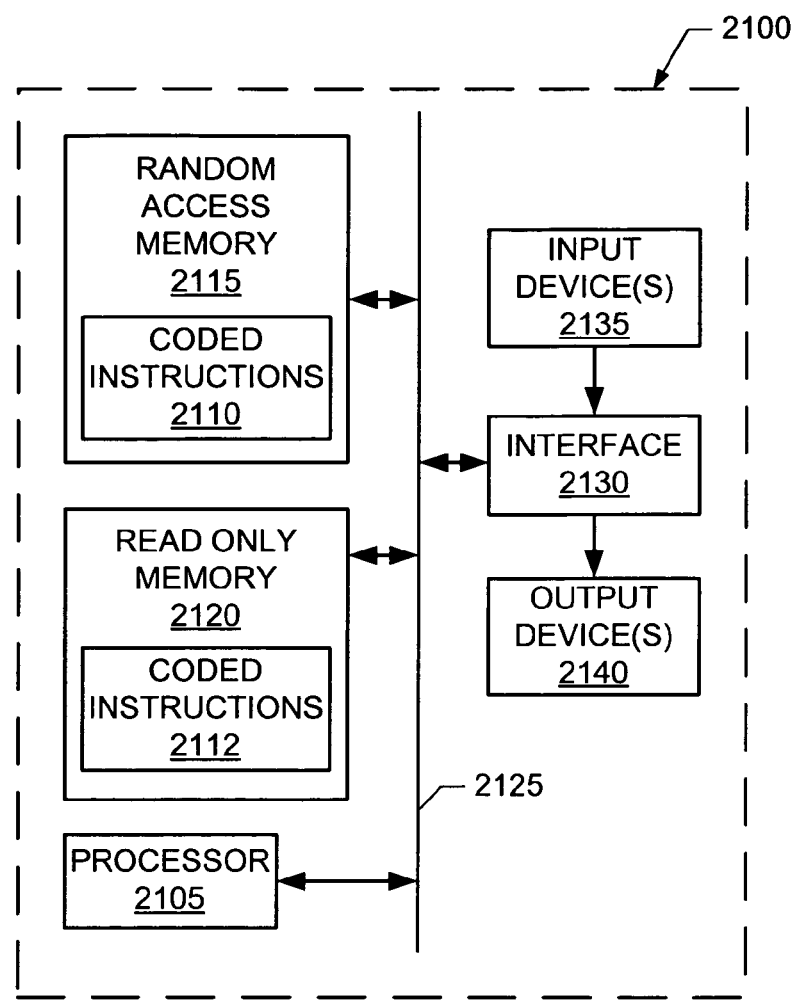
FIG. 21 is a schematic illustration of an example processor platform that may be used and/or programmed to execute the example processes illustrated in FIGS. 5, 6, 7, 8, 9, 10, 11, 12 and/or 13 to implement distributed media-protection and/or distributed media-aggregation and/or, more generally, the example distributed media-protection and/or distributed media-aggregation system of FIG. 1.

FIG. 21 is a schematic diagram of an example processor platform 2100 that may be used and/or programmed to implement the example distributed media module 205, the example slicer and hopper 415, the example de-slicer and aggregator 445, the example control module 455 and/or, more generally, the example media devices 101-106 of FIGS. 1, 2, 3 and/or 4. For example, the processor platform 2100 can be implemented by one or more general purpose processors, cores, microcontrollers, etc.

The processor platform 2100 of the example of FIG. 21 includes a general purpose programmable processor 2105. The processor 2105 executes coded instructions 2110 and/or 2112 present in main memory of the processor 2105 (e.g., within a RAM 2115 and/or within a ROM 2120). The processor 2105 may be any type of processing unit, such as processor cores, processors and/or microcontrollers. The processor 2105 may execute, among other things, the example processes of FIGS. 5, 6, 7, 8, 9, 10, 11, 12, and/or 12 to implement the example distributed media module 205, the example slicer and hopper 415, the example de-slicer and aggregator 445, the example control module 455 and/or, more generally, the example media devices 101-106 of FIGS. 1, 2, 3 and/or 4. The processor 2105 is in communication with the main memory (including the ROM 2120 and the RAM 2115) via a bus 2125. The RAM 2115 may be implemented by dynamic RAM (DRAM), Synchronous DRAM (SDRAM), and/or any other type of RAM device, and ROM may be implemented by flash memory and/or any other desired type of memory device. Access to the memory 2115 and 2120 may be controlled by a memory controller (not shown). The RAM 2115 may be used to store, for example, the example universal directory of FIG. 17 and/or the example device list of FIG. 18.

The processor platform 2100 also includes an interface circuit 2130. The interface circuit 2130 may be implemented by any type of interface standard, such as an external memory interface, serial port, general purpose input/output, etc. One or more input devices 2135 and one or more output devices 2140 are connected to the interface circuit 2130. The input devices 2135 and/or output devices 2140 may be used to, for example, implement an interface between the example communications controller 430 and the example network interface 255 of FIGS. 2, 3 and/or 4

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. In a content delivery system comprising a content provider and a plurality of media devices in communication with the content provider, wherein each of the plurality of media devices is associated with at least one of a plurality of subscribers, a method of providing a media stream for display, comprising the steps of:
receiving a user input in a first media device associated with a first subscriber of the plurality of subscribers and not with a second subscriber of the plurality of subscribers, the user input selecting the media stream;
receiving, responsive to the user input, the selected media stream in the first media device from the content provider;
splitting, at the first media device, the received media stream into at least two portions;
allocating, using the first media device, a first of the at least two portions to the first media device and a second of the at least two portions to a second media device associated with the second subscriber of the plurality of subscribers based upon $f_{crypto}(N,S)$, wherein $f_{crypto}(N,S)$ is a cryptographic combination of N and S, N is based upon a name of the media stream, and S is a pseudorandom seed;
storing the first of the at least two portions on the first media device and transmitting the second of the at least two portions from the first media device to the second media device for storage therein based upon the allocation; and
outputting the media stream from the first media device to a display device electrically coupled to the first media device, the media stream being output by the display device to present the media stream to the user.

2. The method as defined in claim 1, wherein the media stream represents at least one of a piece of media, a program, a file, a media slice or a media segment.

3. The method as defined in claim 1, wherein each of the first media device and second media device comprises at least one of a home media center, a residential gateway, a home media server, a digital video recorder, a video cassette recorder, a personal computer, a game playing console, a television, a satellite receiver, or a cable television receiver.

4. The method as defined in claim 1, wherein metadata associated with the media stream comprises an encrypted version of the pseudorandom seed, and further comprising:
extracting the encrypted pseudorandom seed from the metadata; and
decrypting the extracted encrypted pseudorandom seed.

5. The method as defined in claim 1, further comprising encrypting, at the first media device, the at least two portions before they are stored on the first media device and the second media device.

6. The method as defined in claim 1, wherein allocating the second of the at least two portions to the second media device based upon $f_{crypto}(N\ S)$ comprises:
   computing N as a first hash based upon the name of the media stream;
   computing $f_{crypto}(N,S)$ as a second hash based upon the first hash and the pseudorandom seed;
   modifying the second hash based upon a count of communicatively coupled media devices; and
   allocating the second of the at least two portions to the second media device based upon the modified second hash.

7. The method as defined in claim 1, further comprising storing a duplicate copy of the one of the at least two portions on a redundant media device.

8. The method as defined in claim 1, further comprising notifying the second media device that the media stream was received at the first media device.

9. The method as defined in claim 1, further comprising not storing the first and second of the at least two portions when the media stream is at least one of recorded, being recorded, stored or being stored by the second media device.

10. The method as defined in claim 1, first media device consists of at least one of a set top box, a digital video recorder, a television, a satellite receiver, or a cable television receiver.

11. The method of claim 1, wherein a size of each portion is configured by the content provider.

12. In a content delivery system comprising a content provider and a plurality of media devices in communication with the content provider, wherein each of the plurality of media devices is associated with at least one of a plurality of subscribers, a method of providing a media stream for display, comprising the steps of:
   receiving at a first media device associated with a first subscriber, a user selection to playback the media stream, the media stream associated with metadata comprising an encrypted version of a pseudorandom seed;
   extracting the encrypted version of the pseudorandom seed from the metadata;
   decrypting the encrypted version of the pseudorandom seed to determine whether the first media device is authorized to playback the media;
   identifying, using the first media device, at least two media devices storing respective ones of at least two media slices of the selected media based upon $f_{crypto}(N,S)$, wherein $f_{crypto}(N,S)$ is a cryptographic combination of N and S, N is based upon a name of the media stream, and S is a pseudorandom seed, wherein at least one of the at least two of the media devices storing respective ones of the at least two media slices of the selected media is associated with a second subscriber and not the first subscriber;
   gathering, using the first media device, the at least two media slices from the identified at least two media devices;
   combining, in the first media device, the at least two media slices to form the media stream; and
   outputting the media stream from the first media device to a display device electrically coupled to the first media device, the media stream being output by the display device to present the media stream to the user.

13. The method as defined in claim 12, further comprising tracking at least one of collection, combining or playback of the media.

14. The method as defined in claim 12, wherein the media stream is only stored in volatile memory.

15. The method as defined in claim 12, further comprising decrypting the at least two media slices before they are combined.

16. The method as defined in claim 12, wherein identifying the at least two media devices based upon $f_{crypto}(N,S)$ comprises:
   computing N as a first hash based upon the name of the media stream;
   computing $f_{crypto}(N,S)$ as a second hash based upon the first hash and the decrypted pseudorandom seed;
   modifying the second hash based upon a count of the at least two media devices; and
   identifying the at least two media devices based upon the modified second hash.

17. The method as defined in claim 12, wherein at least one of the media slices is stored on the first media device.

18. The method as defined in claim 12, further comprising receiving a notification that the media was recorded by one of the at least two media devices.

19. The method as defined in claim 18, further comprising not recording the media if the notification is received.

20. The method as defined in claim 12, wherein the first media device consists of at least one of a set top box, a digital video recorder, a television, a satellite receiver, or a cable television receiver.

21. A media device for use with a content delivery system comprising a content provider and a plurality of other media devices in communication with the content provider, wherein the media device and each of the plurality of other media devices is associated with at least one of a plurality of subscribers, comprising:
   a hardware input device to receive input from a first subscriber of the plurality of subscribers, the input selecting a piece of media for playback;
   a distributed media module to identify a first identified media device of the plurality of other media devices, the first identified media device associated with a second subscriber and storing a first media slice of the selected piece of media based upon $f_{crypto}(N,S)$, wherein $f_{crypt}(N,S)$ is a cryptographic combination of N and S, N is based upon a name of the piece of media, and S is a pseudorandom seed, to identify a second identified media device of the plurality of other media devices, the second identified media device associated with a third subscriber storing a second media slice of the selected piece of media based upon $f_{crypt}(N,S)$, to gather the first media slice and the second media slice from the first identified media device and the second identified media device, and combine the first identified media slice and the second identified media slice to form a media stream representative of the media;
   a security device to decrypt an encrypted version of the pseudorandom seed, the encrypted version of the pseudorandom seed extracted from metadata associated with the media stream; and
   a display module to output the media stream to a display device electrically coupled to the media device, the media stream being output by the display device to present the media stream to the user.

22. The media device as defined in claim 21, further comprising volatile storage to buffer the media stream.

23. The media device as defined in claim 21, further comprising a decrypter to decrypt the media slices.

24. The media device as defined in claim 21, wherein the piece of media was recorded by at least one of the first and second identified media devices, and the media device further comprises a memory to store a universal directory that lists the piece of media.

25. The media device as defined in claim 21, wherein the piece of media was recorded by the media device, and the media device further comprises a memory to store a media directory that lists the piece of media.

26. The media device as defined in claim 21, wherein the distributed media module applies forward error correction logic to adjust for at least one of ft the first identified media slice or the second identified media slice if the one of the first identified media slice or the second identified media slice is corrupted or missing media slice.

27. The media device as defined in claim 21, wherein the apparatus consists of at least one of a set top box, a digital video recorder, a television, a satellite receiver, or a cable television receiver.

28. The media device of claim 21, wherein:
N is a first hash of at least a name of the piece of media;
$f_{crypto}(N,S)$ is a hash of N and S; and
the first identified media device and the second identified media device are identified based upon $f_{crpto}(N,S)$ modified based upon a count of the plurality of other media devices.

29. In a content delivery system comprising a content provider and a plurality of media devices in communication with the content provider, wherein each of the media devices is associated with at least one of a plurality of subscribers, a media device comprising:
a hardware input module to receive an input from a first of the plurality of subscribers selecting a media stream;
a front end module, responsive to the input, to receive the selected media stream, wherein metadata associated with the media stream comprises an encrypted pseudorandom seed;
a security module to extract the encrypted pseudorandom seed from the metadata and to decrypt the encrypted pseudorandom seed;
a distributed media module comprising a slicer to split the received media stream into at least two portions, and to select one of the at least two portions of the media stream to be stored on a second media device associated with a second of the plurality of subscribers based upon $f_{crypto}(N,S)$, wherein $f_{crypto}(N,S)$ is a combination of N and S, N is based upon a name of the media stream, and S is the extracted pseudorandom seed;
a network interface to transmit the selected one of the at least two portions of the media stream to the second media device, wherein at least one of the front end module, the security module; and
a display module to output the selected media stream to a display device electrically coupled to the media device, the media stream being output by the display device to present the media stream to the user.

30. The media device as defined in claim 29, wherein the distributed media module further comprises a de-slicer and hopper to collect at least two portions of a second media stream and to determine an identification of a third media device based upon a second pseudorandom seed contained in second metadata associated with the second media stream, wherein at least one of the at least two portions of the second media stream are stored by the third media device.

31. The media device as defined in claim 29, further comprising an encrypter to encrypt the one of the at least two portions of the media stream.

32. The media device as defined in claim 29, further comprising a third media device to store a duplicate copy of the one of the at least two portions of the media stream stored at the second media device.

33. The media device as defined in claim 29, wherein the third media device is a redundant media device to mirror the second media device.

34. The media device as defined in claim 29, wherein the media device consists of at least one of a set top box, a digital video recorder, a television, a satellite receiver, or a cable television receiver.

35. The media device of claim 29, wherein:
N is a first hash of at least a name of the piece of media;
$f_{crypto}(N,S)$ is a hash of N and S; and
the first identified media device and the second identified media device are identified based upon $f_{crypto}(N,S)$ modified based upon a count of the plurality of other media devices.

36. A non-transitory computer-readable media storing machine accessible instructions which, when executed, cause a first media device of a plurality of media devices to:
receive input from a first subscriber of a plurality of subscribers in the first media device, the input selecting media for playback by the first media device, the media having associated metadata comprising an encrypted pseudorandom seed;
extract the encrypted pseudorandom seed from the metadata;
decrypt the encrypted pseudorandom seed;
identify, at the first media device, at least two other of the plurality of media devices associated with other of the plurality of subscribers, each storing respective ones of at least two media slices of the selected media based upon $f_{crypto}(N,S)$, wherein $f_{crypto}(N,S)$ is a combination of N and S, N is based upon a name of the media stream, and S is a pseudorandom seed;
gather the at least two media slices from the identified at least two of the plurality of media devices;
combine the at least two media slices to form a media stream representative of the media; and
output the media stream from the first media device to a display device electrically coupled to the first media device, the media stream being output by the display device to present the media stream to the first subscriber.

37. The non-transitory computer-readable media as defined in claim 36, wherein the machine accessible instructions, when executed, cause the first media device to only store the media stream in a volatile memory.

38. The non-transitory computer-readable media as defined in claim 36, wherein the machine accessible instructions, when executed, cause the first media device to identify the at least two other of the plurality of media devices by:
computing N as a first hash based upon the name of the media;
computing $f_{crypto}(N,S)$ as a second hash based upon the first hash and the pseudorandom seed;
modifying the second hash based upon a count of the at least two other of the plurality of media devices; and
identifying the at least two other of the plurality of media devices based upon the modified second hash.

39. The non-transitory computer-readable media as defined in claim 36, wherein the machine accessible instructions, when executed, cause the first media device to receive a notification that the media was recorded by one of the at least two media devices.

40. In a content delivery system comprising a content provider and a plurality of media receivers in communication with the content provider, a method of providing a media stream for display, comprising the steps of:

receiving a user input in a first media receiver, the user input selecting the media stream;

receiving, responsive to the user input, the selected media stream in the first media receiver from the content provider;

splitting, at the first media receiver, the received media stream into at least two portions;

allocating, using the first media receiver, a first of the at least two portions to the first media receiver and a second of the at least two portions to a second media receiver based upon $f_{crypto}(N,S)$, wherein $f_{crypto}(N,S)$ is a cryptographic combination of N and S, N is based upon a name of the media stream, and S is a pseudorandom seed;

storing the first of the at least two portions on the first media receiver and transmitting the second of the at least two portions from the first media receiver to the second media receiver for storage therein based upon the allocation; and outputting the media stream from the first media device to a display device electrically coupled to the first media receiver, the media stream being output by the display device to present the media stream to the user.

41. The method of claim 40, wherein the first media receiver and the second media receiver are disposed in different residences.

42. The method as defined in claim 40, wherein allocating the second of the at least two portions to the second media device based on $f_{crytpo}(N,S)$ comprises:

computing N as a first hash based upon the name of the media stream;

computing $f_{crypto}(N,S)$ as a second hash based upon the first hash and the pseudorandom seed;

modifying the second hash based upon a count of communicatively coupled media devices; and allocating the second of the at least two portions to the second media device based upon the modified second hash.

* * * * *